US012640314B2

(12) United States Patent
Sasaki

(10) Patent No.: US 12,640,314 B2
(45) Date of Patent: May 26, 2026

(54) MULTILAYER CERAMIC CAPACITOR AND MOUNTING STRUCTURE OF MULTILAYER CERAMIC CAPACITOR

(71) Applicant: Murata Manufacturing Co., Ltd., Nagaokakyo (JP)

(72) Inventor: Tomohiro Sasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 177 days.

(21) Appl. No.: 18/116,986

(22) Filed: Mar. 3, 2023

(65) Prior Publication Data

US 2023/0343521 A1     Oct. 26, 2023

(30) Foreign Application Priority Data

Apr. 26, 2022     (JP) ................................. 2022-072494

(51) Int. Cl.
| | |
|---|---|
| H01G 4/30 | (2006.01) |
| H01G 4/005 | (2006.01) |
| H01G 4/12 | (2006.01) |

(52) U.S. Cl.
CPC ............. H01G 4/306 (2013.01); H01G 4/005 (2013.01); H01G 4/12 (2013.01)

(58) Field of Classification Search
CPC ........... H01G 4/30; H01G 4/306; H01G 4/12; H01G 4/005; H01G 4/232; H01G 4/248
USPC ............. 361/301.4, 321.1, 321.3, 306.3, 303
See application file for complete search history.

(56) References Cited

U.S. PATENT DOCUMENTS

| | | | |
|---|---|---|---|
| 7,567,425 B1 * | 7/2009 | Lee .......................... | H01G 4/30 |
| | | | 361/321.1 |
| 7,595,973 B1 | 9/2009 | Lee et al. | |
| 7,630,208 B2 * | 12/2009 | Lee ........................ | H01G 4/385 |
| | | | 361/306.3 |
| 10,002,713 B1 | 6/2018 | Vaughan et al. | |
| 2007/0128794 A1 * | 6/2007 | Kusano ................ | H01G 4/2325 |
| | | | 257/314 |

(Continued)

FOREIGN PATENT DOCUMENTS

| | | | | |
|---|---|---|---|---|
| JP | | H0349306 A | * | 3/1991 |
| JP | | 2009218363 A | * | 9/2009 |

(Continued)

*Primary Examiner* — Arun Ramaswamy
(74) *Attorney, Agent, or Firm* — Keating & Bennett, LLP

(57)     ABSTRACT

A multilayer ceramic capacitor includes a multilayer body including dielectric layers and internal electrode layers, first and second main surfaces facing each other in a stacking direction, first and second side surfaces facing each other in a width direction perpendicular or substantially perpendicular to the stacking direction, and first and second end surfaces facing each other in a length direction perpendicular or substantially perpendicular to the stacking and width directions, a first external electrode on the first end surface, a second external electrode on the second end surface, a third external electrode on the first side surface, and a fourth external electrode on the second side surface. A first internal electrode layer is exposed at the first and second end surfaces, and a second internal electrode layer is exposed at the first and second side surfaces and is within a range from the second main surface to $\frac{1}{3}$ of the multilayer body in the stacking direction.

14 Claims, 22 Drawing Sheets

V–V CROSS-SECTIONAL VIEW

(56)                    References Cited

U.S. PATENT DOCUMENTS

| 2009/0139757 A1* | 6/2009 | Lee | H05K 1/0231 |
| | | | 361/303 |
| 2009/0244807 A1* | 10/2009 | Lee | H01G 4/385 |
| | | | 361/306.2 |
| 2012/0120546 A1* | 5/2012 | Togashi | H01G 4/35 |
| | | | 361/302 |
| 2012/0250218 A1 | 10/2012 | Togashi et al. | |
| 2015/0047890 A1* | 2/2015 | Lee | H01G 4/248 |
| | | | 361/301.4 |
| 2015/0287549 A1* | 10/2015 | Park | H01G 4/005 |
| | | | 361/270 |
| 2016/0049243 A1 | 2/2016 | Uno et al. | |
| 2016/0189867 A1* | 6/2016 | Zaima | H01G 4/012 |
| | | | 361/301.4 |
| 2020/0152384 A1 | 5/2020 | Sasaki | |

FOREIGN PATENT DOCUMENTS

| JP | 2010-028767 A | 2/2010 |
| JP | 2010-045323 A | 2/2010 |
| JP | 2012-169536 A | 9/2012 |
| JP | 2012-191007 A | 10/2012 |
| JP | 2012-221993 A | 11/2012 |
| JP | 2012-248571 A | 12/2012 |
| JP | 2014-183241 A | 9/2014 |
| JP | 2015-019083 A | 1/2015 |
| JP | 2020-505772 A | 2/2020 |
| JP | 2020-077793 A | 5/2020 |

* cited by examiner

FIG.4

V–V CROSS-SECTIONAL VIEW

VI-VI CROSS-SECTIONAL VIEW

VII–VII CROSS–SECTIONAL VIEW

VIII–VIII CROSS–SECTIONAL VIEW

XVI-XVI CROSS-SECTIONAL VIEW

XVII–XVII CROSS-SECTIONAL VIEW

XVIII-XVIII CROSS-SECTIONAL VIEW

XIX-XIX CROSS-SECTIONAL VIEW

MULTILAYER CERAMIC CAPACITOR AND MOUNTING STRUCTURE OF MULTILAYER CERAMIC CAPACITOR

CROSS REFERENCE TO RELATED APPLICATIONS

This application claims the benefit of priority to Japanese Patent Application No. 2022-072494 filed on Apr. 26, 2022. The entire contents of this application are hereby incorporated herein by reference.

BACKGROUND OF THE INVENTION

1. Field of the Invention

The present invention relates to a multilayer ceramic capacitor and a mounting structure of the multilayer ceramic capacitor.

2. Description of the Related Art

For example, there are known a decoupling capacitor used for stabilizing a power supply voltage supplied to an integrated circuit component (IC) that operates at a high speed, and a through-type multilayer ceramic capacitor used for taking measures against noise of a power supply line supplied to the integrated circuit component (IC). For example, a through-type multilayer ceramic capacitor generally includes a ceramic body (a multilayer body) having an outer surface including a first main surface and a second main surface that face each other, a first side surface and a second side surface that face each other, and a first end surface and a second end surface that face each other. Inside the ceramic body, a plurality of first internal electrodes and a plurality of second internal electrodes are alternately arranged in the direction in which these electrodes are stacked. Each of the first internal electrodes has both ends that respectively lead to the first and second end surfaces to be connected to the first and second external electrodes. Further, each of the second internal electrodes has both ends that respectively lead to the first and second side surfaces to be connected to the third and fourth external electrodes.

Such a through-type multilayer ceramic capacitor may be reduced in total number of internal electrodes in order to reduce the capacitance. In this case, when the total number of internal electrodes is reduced, the direct-current (DC) resistance (Rdc) increases, with the result that the amount of heat generated by the through-type multilayer ceramic capacitor may sometimes increase.

Thus, as a structure capable of suppressing an increase in DC resistance while suppressing an increase in capacitance, there is known a structure in which a plurality of signal internal electrodes are contiguously stacked as disclosed in Japanese Patent Laid-Open No. 2012-221993. According to the structure disclosed in Japanese Patent Laid-Open No. 2012-221993, the value of the DC resistance (Rdc) can also be reduced while reducing the capacitance.

SUMMARY OF THE INVENTION

However, when capacitance portions are disposed on the upper and lower sides in the structure as disclosed in Japanese Patent Laid-Open No. 2012-221993, the external electrodes on the side surfaces (the third and fourth external electrodes) are connected to the capacitance portions located far from the mounting surface, which increases the area where the external electrodes on the side surfaces cover the multilayer body near the signal electrode (the first internal electrode), thereby causing a problem that a sufficient heat dissipation effect cannot be achieved. Further, the current path to the mounting substrate is increased in length, thereby also causing a problem that the effect of low equivalent series inductance (ESL) cannot be sufficiently achieved.

Thus, preferred embodiments of the present invention provide multilayer ceramic capacitors and mounting structures of the multilayer ceramic capacitors that are each capable of fully achieving a sufficient heat dissipation effect and a low ESL effect while decreasing a capacitance and yet suppressing an increase in DC resistance.

A multilayer ceramic capacitor according to a preferred embodiment of the present invention includes a multilayer body including a plurality of dielectric layers stacked on one another and a plurality of internal electrode layers respectively stacked on the dielectric layers, the multilayer body including a first main surface and a second main surface that face each other in a stacking direction, a first side surface and a second side surface that face each other in a width direction perpendicular or substantially perpendicular to the stacking direction, and a first end surface and a second end surface that face each other in a length direction perpendicular or substantially perpendicular to the stacking direction and the width direction, a first external electrode on the first end surface, a second external electrode on the second end surface, a third external electrode on the first side surface, and a fourth external electrode on the second side surface. The internal electrode layers include a first internal electrode layer exposed at the first end surface and the second end surface, and a second internal electrode layer exposed at the first side surface and the second side surface. The second internal electrode layer is located within a range from the second main surface to one third of the multilayer body in the stacking direction.

Further, a mounting structure of a multilayer ceramic capacitor according to a preferred embodiment of the present invention includes a mounting substrate, and a multilayer ceramic capacitor mounted on the mounting substrate. The multilayer ceramic capacitor is a multilayer ceramic capacitor according to a preferred embodiment of the present invention, and the mounting substrate includes a core of a substrate, a first connection conductor on the core and connected to the first external electrode, a second connection conductor on the core and connected to the second external electrode, a third connection conductor on the core and connected to the third external electrode, and a fourth connection conductor on the core and connected to the fourth external electrode. The multilayer ceramic capacitor is mounted such that the second main surface faces the mounting substrate.

According to a preferred embodiment of the present invention, it is possible to provide multilayer ceramic capacitors and mounting structures of the multilayer ceramic capacitors that are each capable of fully achieving a sufficient heat dissipation effect and a low ESL effect while decreasing a capacitance and yet suppressing an increase in DC resistance.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a side view showing an example of the multilayer ceramic capacitor according to the first preferred embodiment of the present invention.

FIG. 13 is a top view showing an example of the multilayer ceramic capacitor according to the second preferred embodiment of the present invention.

FIG. 14 is a bottom view showing an example of the multilayer ceramic capacitor according to the second preferred embodiment of the present invention.

DETAILED DESCRIPTION OF THE PREFERRED EMBODIMENTS

A. First Preferred Embodiment

1. Multilayer Ceramic Capacitor

A multilayer ceramic capacitor 10 according to the first preferred embodiment of the present invention will be hereinafter described. Multilayer ceramic capacitor 10 is a through-type multilayer ceramic capacitor (a multilayer ceramic capacitor of a three-terminal type).

Figure 1:
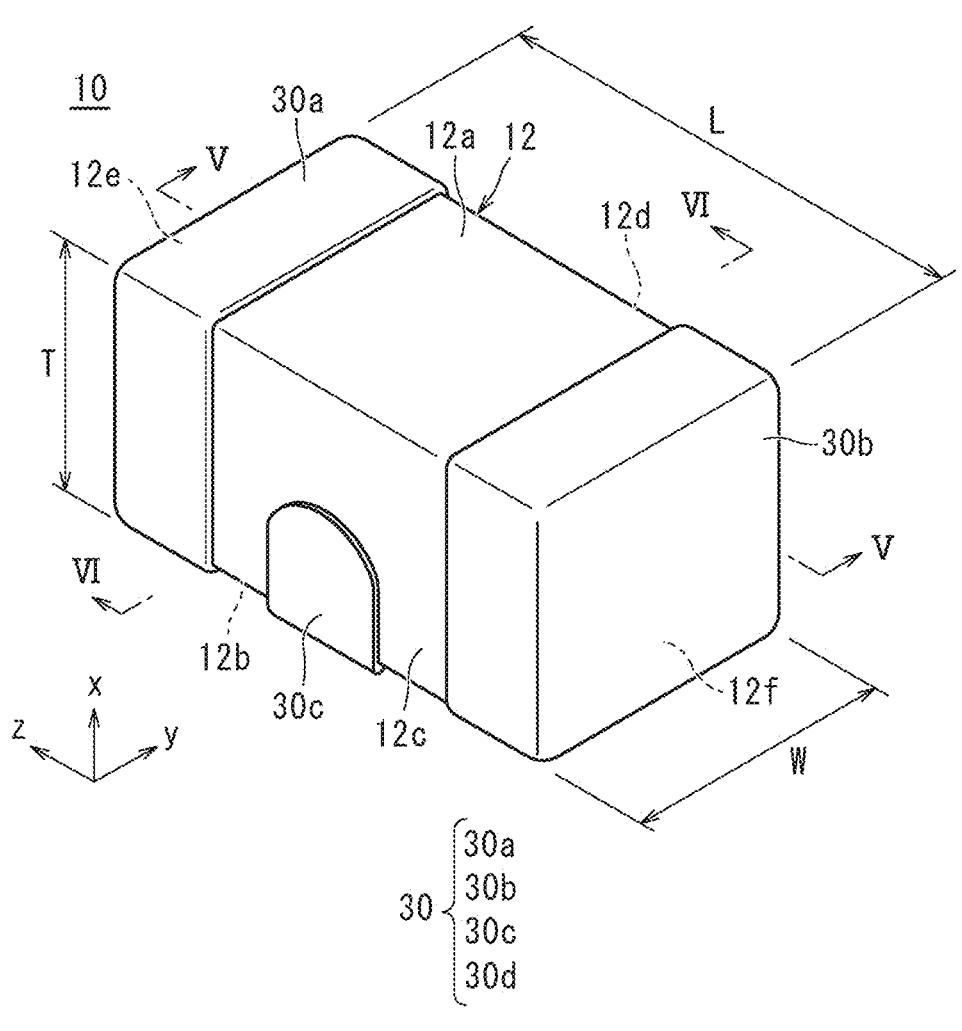
FIG. 1 is an external perspective view showing an example of a multilayer ceramic capacitor according to a first preferred embodiment of the present invention.
Figure 2:
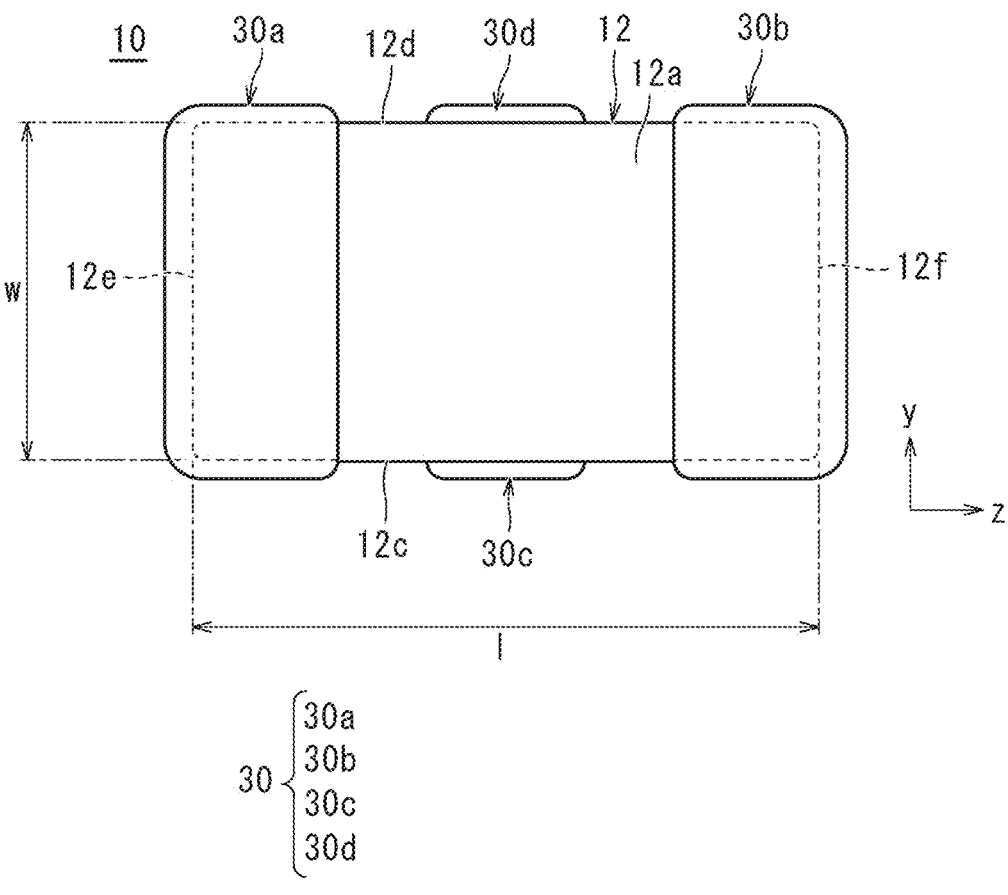
FIG. 2 is a top view showing an example of the multilayer ceramic capacitor according to the first preferred embodiment of the present invention.
Figure 3:
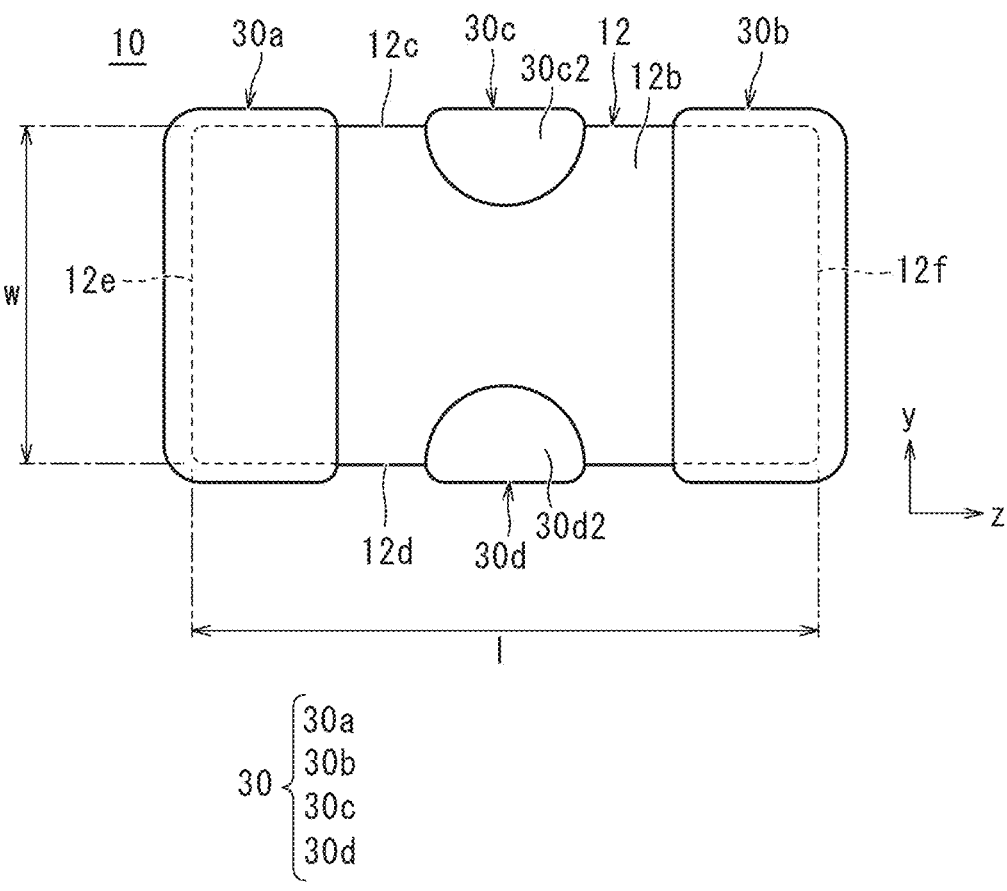
FIG. 3 is a bottom view showing an example of the multilayer ceramic capacitor according to the first preferred embodiment of the present invention.
Figure 4:
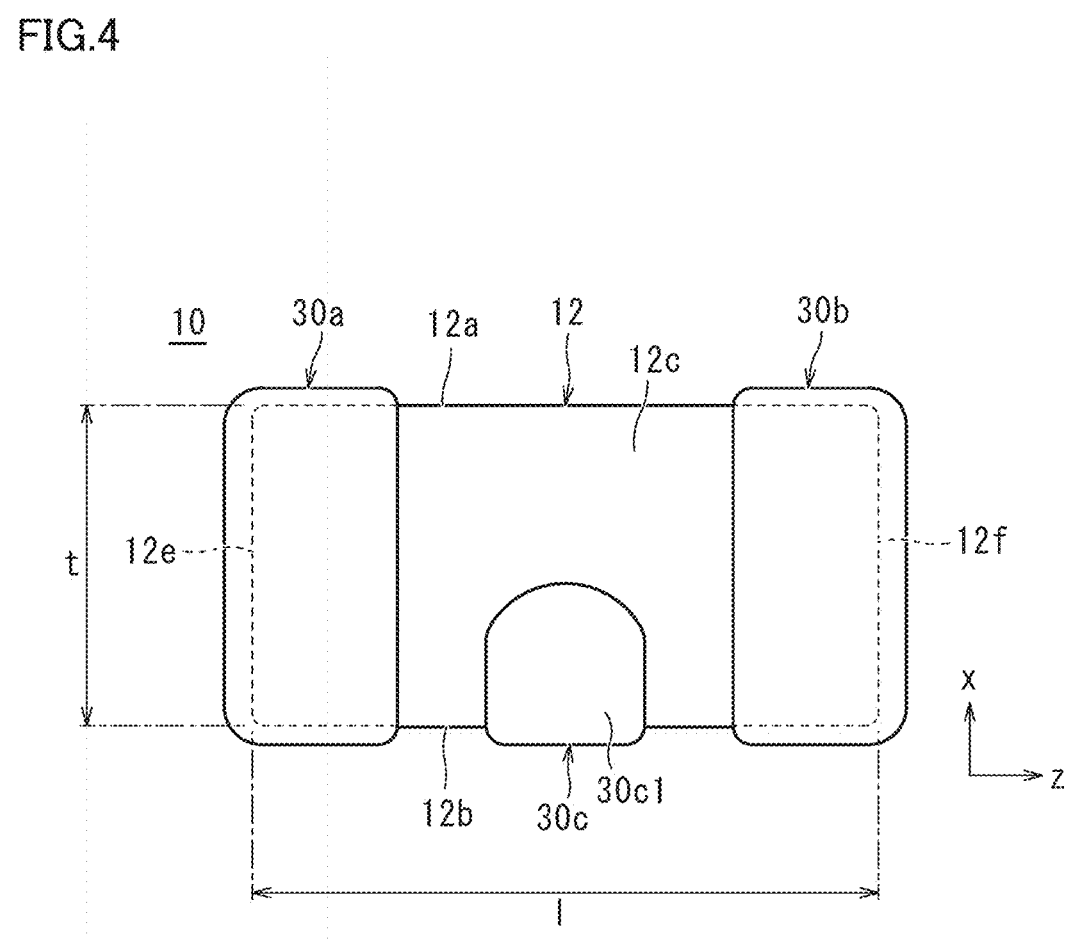
Figure 5:
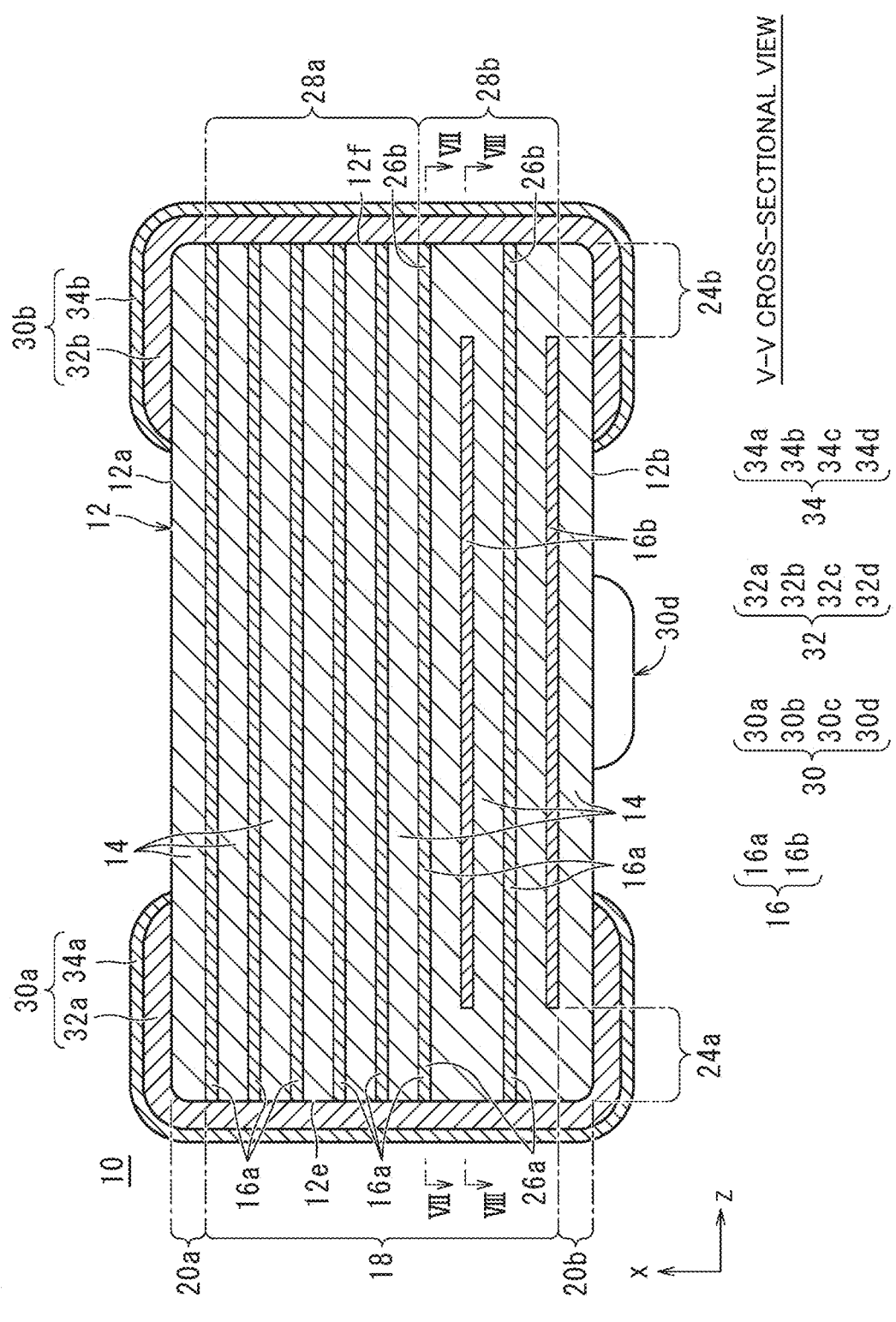
FIG. 5 is a cross-sectional view taken along a line V-V in FIG. 1.
Figure 6:
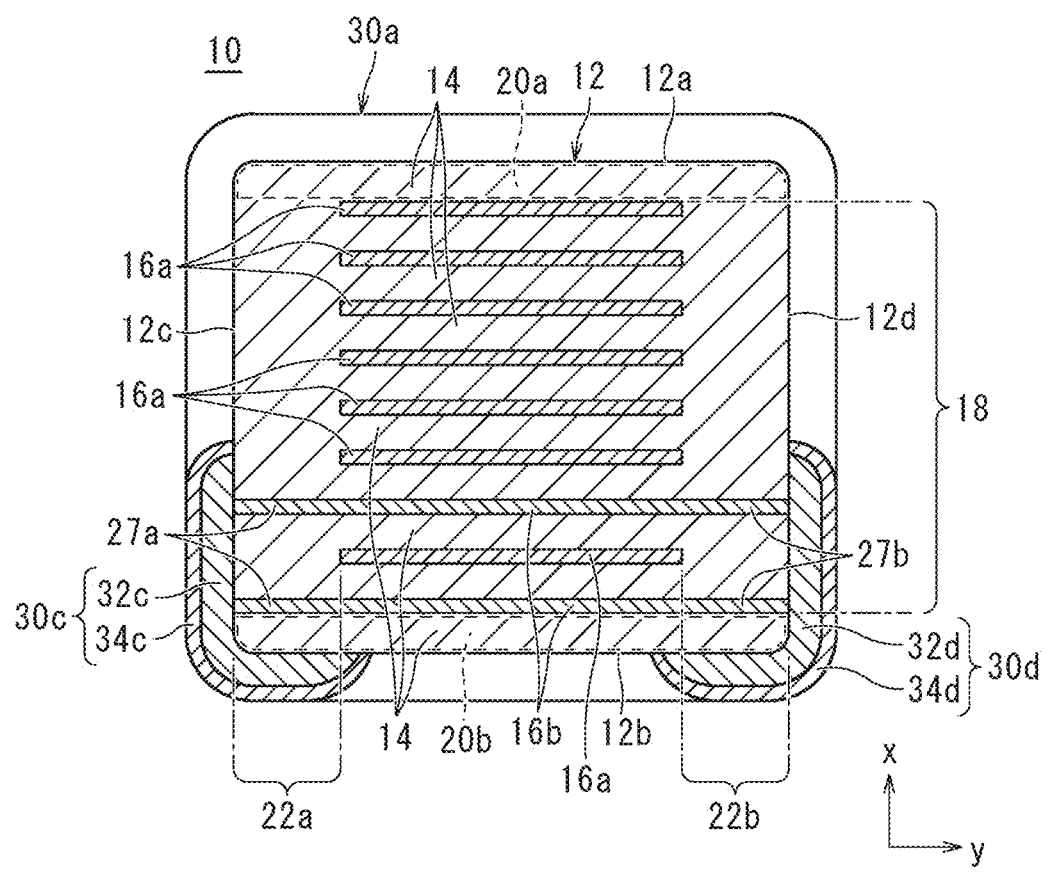
FIG. 6 is a cross-sectional view taken along a line VI-VI in FIG. 1.
Figure 7:
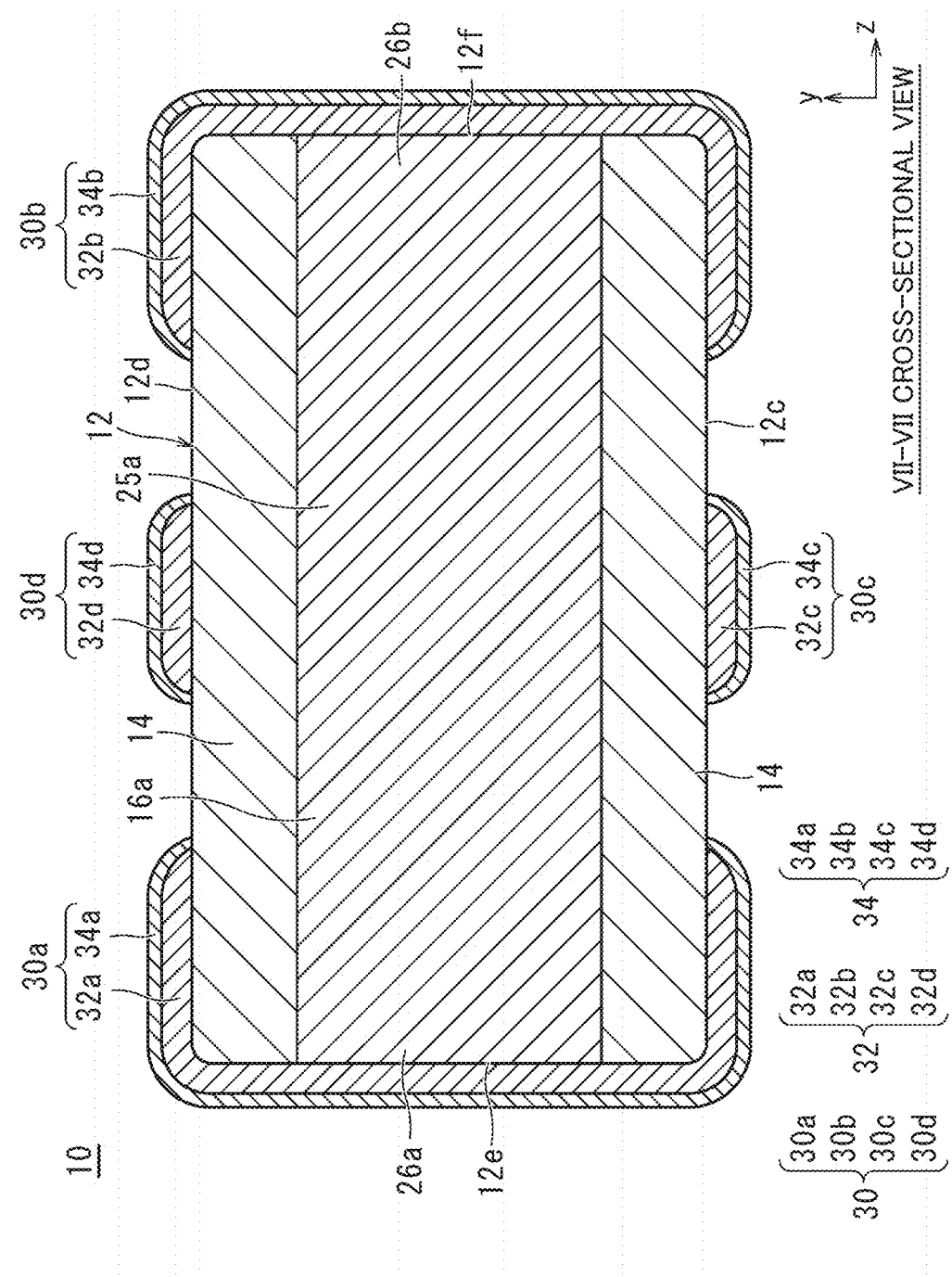
FIG. 7 is a cross-sectional view taken along a line VII-VII in FIG. 5.
Figure 8:
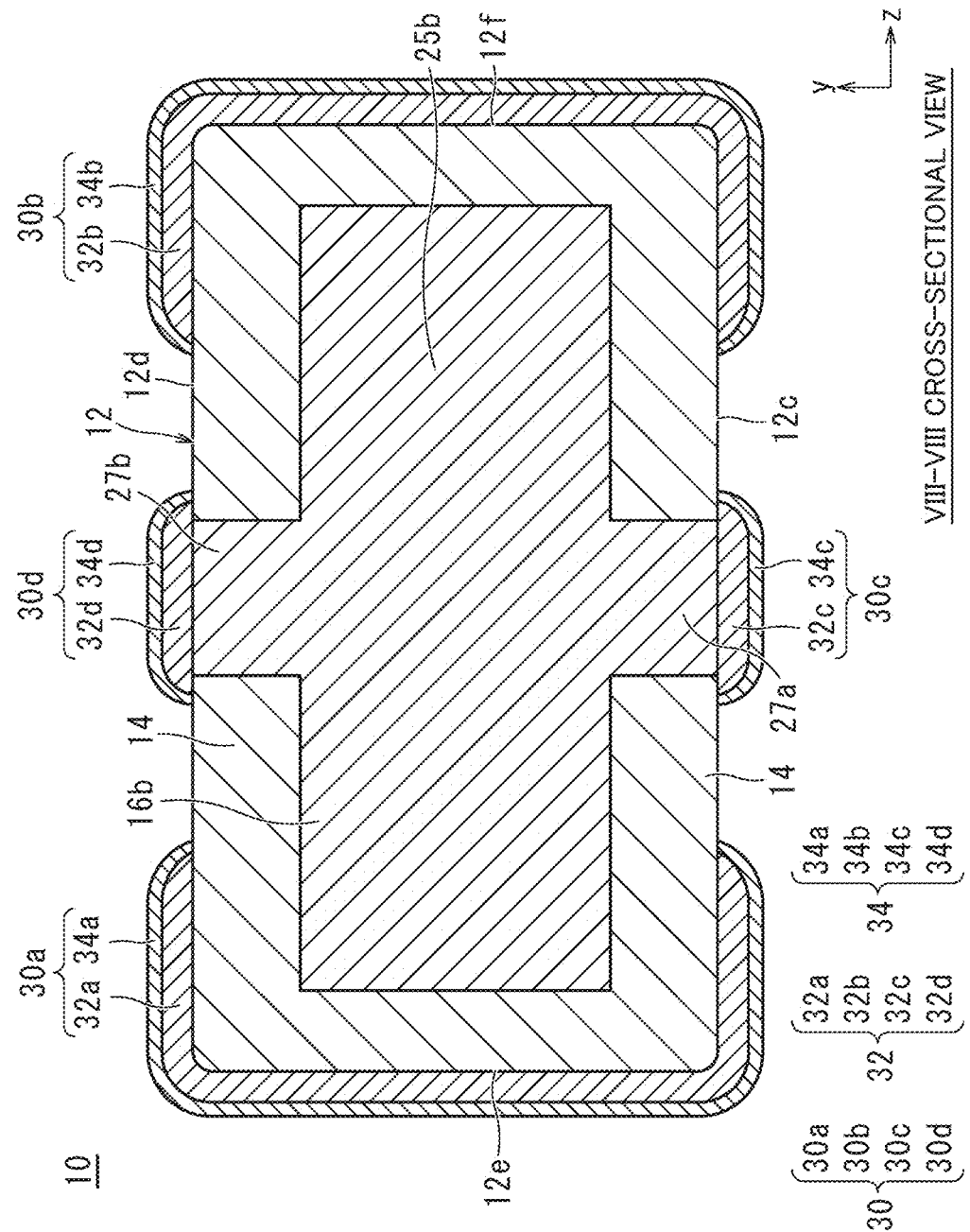
FIG. 8 is a cross-sectional view taken along a line VIII-VIII in FIG. 5.
Figure 9:
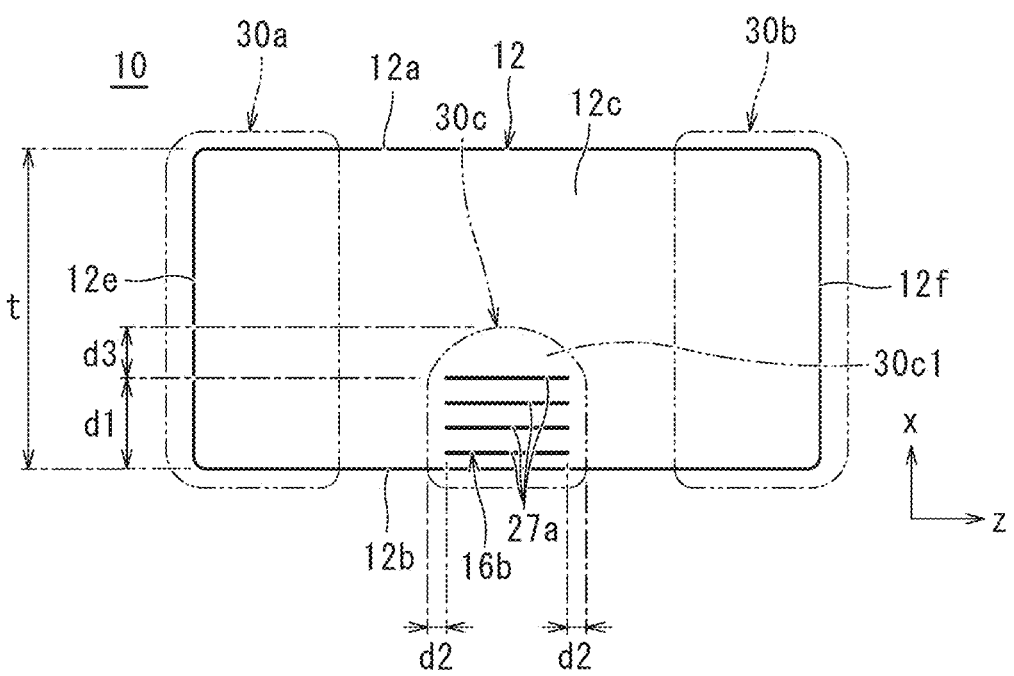
FIG. 9 is a schematic diagram viewed from the side of a first side surface of the multilayer ceramic capacitor according to the first preferred embodiment of the present invention.

FIG. 1 is an external perspective view showing an example of a multilayer ceramic capacitor according to the first preferred embodiment of the present invention. FIG. 2 is a top view showing an example of the multilayer ceramic capacitor according to the first preferred embodiment of the present invention. FIG. 3 is a bottom view showing an example of the multilayer ceramic capacitor according to the first preferred embodiment of the present invention. FIG. 4 is a side view showing an example of the multilayer ceramic capacitor according to the first preferred embodiment of the present invention. FIG. 5 is a cross-sectional view taken along a line V-V in FIG. 1. FIG. 6 is a cross-sectional view taken along a line VI-VI in FIG. 1. FIG. 7 is a cross-sectional view taken along a line VII-VII in FIG. 5. FIG. 8 is a cross-sectional view taken along a line VIII-VIII in FIG. 5. FIG. 9 is a schematic diagram viewed from the side of a first side surface of the multilayer ceramic capacitor according to the first preferred embodiment of the present invention.

As shown in FIGS. 1 to 9, multilayer ceramic capacitor 10 includes, for example, a multilayer body 12 and an external electrode 30.

Multilayer body 12 includes a plurality of dielectric layers 14 stacked on one another and a plurality of internal electrode layers 16 respectively stacked on dielectric layers 14. Further, multilayer body 12 includes a first main surface 12a and a second main surface 12b that face each other in a stacking direction x, a first side surface 12c and a second side surface 12d that face each other in a width direction y perpendicular or substantially perpendicular to stacking direction x, and a first end surface 12e and a second end surface 12f that face each other in a length direction z perpendicular or substantially perpendicular to stacking direction x and width direction y.

Multilayer body 12 has a rectangular or substantially rectangular parallelepiped shape having corners and ridges that are preferably rounded. Each of the corners is a portion where three surfaces of multilayer body 12 meet, and each of the ridges is a portion where two surfaces of multilayer body 12 meet. Further, protrusions and recesses or the like may be provided partially or entirely in first and second main surfaces 12a and 12b, first and second side surfaces 12c and 12d, and first and second end surfaces 12e and 12f.

In this case, the dimension of multilayer body 12 in length direction z is defined as a dimension 1, the dimension of multilayer body 12 in width direction y is defined as a dimension w, and the dimension of multilayer body 12 in stacking direction x is defined as a dimension t. The dimensions of multilayer body 12 are not particularly limited but it is preferable that dimension 1 is about 0.9 mm or more and about 1.6 mm or less, dimension w is about 0.4 mm or more and about 0.8 mm or less, and dimension t is about 0.2 mm or more and about 0.6 mm or less.

Multilayer body 12 includes an effective layer portion 18, a first outer layer portion 20a located on the first main surface 12a side, and a second outer layer portion 20b located on the second main surface 12b side. First outer layer portion 20a and second outer layer portion 20b are disposed to sandwich effective layer portion 18 in stacking direction x.

In other words, first outer layer portion 20a is a collection of a plurality of dielectric layers 14 located on the first main surface 12a side of multilayer body 12 and located between first main surface 12a and one of internal electrode layers 16 that is closest to first main surface 12a. Second outer layer portion 20b is a collection of a plurality of dielectric layers 14 located on the second main surface 12b side of multilayer body 12 and located between second main surface 12b and one of internal electrode layers 16 that is closest to second main surface 12b. Further, effective layer portion 18 is a region sandwiched between first outer layer portion 20a and second outer layer portion 20b. Multilayer body 12 includes a first region 28a in which dielectric layers 14 and first internal electrode layers 16a are alternately stacked in stacking direction x connecting first main surface 12a and second main surface 12b, and a second region 28b in which first internal electrode layer 16a and second internal electrode layer 16b are alternately stacked with dielectric layer 14 interposed therebetween. Second region 28b is located closer to second main surface 12b than first region 28a. When second region 28b is located closer to second main surface 12b than first region 28a, the current path extending from second region 28b to mounting substrate 50 and generating a capacitance is shortened, so that a low ESL effect can be achieved.

Multilayer body 12 has side portions (W gaps) 22a and 22b located between first side surface 12c and one end in width direction y of each of a first facing portion 25a of a first internal electrode layer 16a and a second facing portion 25b of a second internal electrode layer 16b (described later), and also located between second side surface 12d and one end in width direction y of each of first facing portion 25a of first internal electrode layer 16a and second facing portion 25b of second internal electrode layer 16b (described later). Side portion 22a and side portions 22b of multilayer body 12 include a first extending portion 27a and a second extending portion 27b, respectively, of second internal electrode layer 16b.

Further, multilayer body 12 has end portions (L gaps) 24a and 24b located between first end surface 12e and one end in length direction z of each of first facing portion 25a of first internal electrode layer 16a and second facing portion 25b of second internal electrode layer 16b (described later), and also located between second end surface 12f and one end in length direction z of each of first facing portion 25a of first internal electrode layer 16a and second facing portion 25b of second internal electrode layer 16b (described later). End portion 24a and end portions 24b of multilayer body 12 include a first leading portion 26a and a second leading portion 26b, respectively, of first internal electrode layer 16a.

Dielectric layer 14 can be made, for example, of a dielectric ceramic including a component such as $BaTiO_3$, $CaTiO_3$, $SrTiO_3$, or $CaZrO_3$ as a ceramic material. Further, dielectric layer 14 may be made of the above-mentioned main component additionally including a subcomponent such as an Mn compound, an Fe compound, a Cr compound, a Co compound, or an Ni compound.

The thickness of dielectric layer 14 is preferably 1 μm or more and 15 μm or less. The number of stacked dielectric layers 14 is preferably 80 or more and 200 or less. This number of dielectric layers 14 is equal to the total number of dielectric layers 14 in effective layer portion 18 and dielectric layers 14 in first and second outer layer portions 20a and 20b.

Internal Electrode Layer

Internal electrode layer 16 includes first internal electrode layer 16a and second internal electrode layer 16b.

First internal electrode layer 16a is disposed on a corresponding one of the plurality of dielectric layers 14. First internal electrode layer 16a extends to reach first end surface 12e and second end surface 12f.

More specifically, as shown in FIG. 7, first internal electrode layer 16a extending between first and second end surfaces 12e and 12f of multilayer body 12 includes first facing portion 25a located in a center portion of first internal electrode layer 16a, a first leading portion 26a extending from first facing portion 25a to reach first end surface 12e of multilayer body 12, and a second leading portion 26b extending from first facing portion 25a to reach second end surface 12f of multilayer body 12. First facing portion 25a is located in a center portion on dielectric layer 14. First leading portion 26a is exposed at first end surface 12e of multilayer body 12, and second leading portion 26b is exposed at second end surface 12f of multilayer body 12. Thus, first internal electrode layer 16a is not exposed at first side surface 12c and second side surface 12d of multilayer body 12.

The shapes of first facing portion 25a, first leading portion 26a, and second leading portion 26b of first internal electrode layer 16a are not particularly limited but are preferably rectangular or substantially rectangular in a plan view. Note that the corners each may be rounded.

Second internal electrode layer 16b is disposed on a corresponding one of the plurality of dielectric layers 14. Further, second internal electrode layer 16b extends to reach first side surface 12c and second side surface 12d. Second internal electrode layer 16b is disposed on dielectric layer 14 different from dielectric layer 14 on which first internal electrode layer 16a is disposed.

More specifically, as shown in FIG. 8, second internal electrode layer 16b extending between first and second side surfaces 12c and 12d of multilayer body 12 includes second facing portion 25b located in a center portion of second internal electrode layer 16b, first extending portion 27a extending from second facing portion 25b to reach first side surface 12c, and second extending portion 27b extending from second facing portion 25b to reach second side surface 12d. Second facing portion 25b is formed in a rectangular or substantially rectangular shape so as to extend in the direction toward first end surface 12e and extend in the direction toward second end surface 12f. Second facing portion 25b is located in a center portion on dielectric layer 14. First extending portion 27a is exposed at first side surface 12c of multilayer body 12, and second extending portion 27b is exposed at second side surface 12d of multilayer body 12. Thus, second internal electrode layer 16b is not exposed at first end surface 12e and second end surface 12f of multilayer body 12.

The shapes of second facing portion 25b, first extending portion 27a, and second extending portion 27b of second internal electrode layer 16b are not particularly limited but are preferably rectangular or substantially rectangular in a plan view. Note that the corners each may be rounded.

First facing portion 25a of first internal electrode layer 16a faces second facing portion 25b of second internal electrode layer 16b. In the present preferred embodiment, first facing portion 25a of first internal electrode layer 16a faces second facing portion 25b of second internal electrode layer 16b with dielectric layer 14 interposed therebetween, to generate a capacitance, so that the characteristics of the capacitor are developed.

The number of first internal electrode layers 16a is preferably larger than the number of second internal electrode layers 16b. When first internal electrode layers 16a are larger in number than second internal electrode layers 16b, the DC resistance is reduced to achieve an effect of suppressing the temperature rise of multilayer body 12.

The number of first internal electrode layers 16a is not particularly limited but is preferably 49 or more and 100 or less, for example. The number of second internal electrode layers 16b is not particularly limited but is preferably 1 or more and 50 or less, for example. Thus, the total number of first internal electrode layers 16a and second internal electrode layers 16b is preferably 50 or more and 150 or less.

The thickness of first internal electrode layer 16a is not particularly limited but is preferably about 0.5 μm or more and about 1.1 μm or less, for example. The thickness of second internal electrode layer 16b is not particularly limited but is preferably about 0.5 μm or more and about 1.1 μm or less, for example.

Second internal electrode layer 16b located closest to first main surface 12a in second region 28b of multilayer body 12 is located within a range from second main surface 12b to one third of multilayer body 12 in stacking direction x. In other words, a length d1 between second main surface 12b and second internal electrode layer 16b located closest to first main surface 12a in second region 28b of multilayer body 12 is equal to or less than about one third of dimension t that is the length dimension of multilayer body 12 in stacking direction x. When second internal electrode layer 16b located closest to first main surface 12a in second region 28b of multilayer body 12 is located within a range from second main surface 12b to about one third of multilayer body 12 in stacking direction x, the current path to mounting substrate 50 is shortened, so that the ESL can be reduced.

More preferably, second region 28b is disposed closer to second main surface 12b than first region 28a. This allows second region 28b to be located close to second main surface 12b, so that the ESL can be more effectively reduced.

First internal electrode layer 16a and second internal electrode layer 16b may be for example made of an appropriate conductive material like metals such as Ni, Cu, Ag, Pd, or Au, or an alloy including at least one of these metals, such as an Ag—Pd alloy.

External Electrode

External electrode 30 is disposed on multilayer body 12, specifically, on each of the first end surface 12e side, the second end surface 12f side, the first side surface 12c side, and the second side surface 12d side. External electrode 30 includes a first external electrode 30a, a second external electrode 30b, a third external electrode 30c, and a fourth external electrode 30d. First external electrode 30a is disposed on first end surface 12e. First external electrode 30a is connected to first internal electrode layer 16a. Further, first external electrode 30a may be disposed also on a portion of first main surface 12a, a portion of second main surface 12b, a portion of first side surface 12c, and a portion of second side surface 12d.

Second external electrode 30b is disposed on second end surface 12f. Second external electrode 30b is connected to first internal electrode layer 16a. Further, second external electrode 30b may be disposed also on a portion of first main surface 12a, a portion of second main surface 12b, a portion of first side surface 12c, and a portion of second side surface 12d.

Third external electrode 30c is disposed on first side surface 12c. Third external electrode 30c is connected to second internal electrode layer 16b. Further, third external electrode 30c may have a first covering portion 30c1 covering second internal electrode layer 16b exposed at first side surface 12c, and a first bent portion 30c2 on second main surface 12b to be in parallel or substantially in parallel with second internal electrode layer 16b. By providing first bent portion 30c2, the reliability of electrical connection to mounting substrate 50 can be further maintained.

Fourth external electrode 30d is disposed on second side surface 12d. Fourth external electrode 30d is connected to second internal electrode layer 16b. Further, fourth external electrode 30d may have a second covering portion 30d1 (not shown) covering second internal electrode layer 16b exposed at second side surface 12d, and a second bent portion 30d2 formed on second main surface 12b to be in parallel or substantially in parallel with second internal electrode layer 16b. By providing second bent portion 30d2, the reliability of electrical connection to mounting substrate 50 can be further maintained.

Further, it is preferable that an end portion of each of third and fourth external electrodes 30c and 30d in length direction z of multilayer body 12 is located at a distance of about 5 μm or more and about 100 μm or less from an end portion of second internal electrode layer 16b in length direction z of multilayer body 12 that is exposed at a corresponding one of first and second side surfaces 12c and 12d of multilayer body 12. In this case, more specifically, a length d2 is preferably about 5 μm or more and about 100 μm or less, in which length d2 extends between an end portion of each of third and fourth external electrodes 30c and 30d in length direction z of multilayer body 12 and an end portion of second internal electrode layer 16b in length direction z of multilayer body 12 that is exposed at a corresponding one of first and second side surfaces 12c and 12d of multilayer body 12.

Further, an end portion of each of third and fourth external electrodes 30c and 30d in stacking direction x of multilayer body 12 is preferably located at a distance of about 5 μm or more and about 100 μm or less from second internal electrode layer 16b closest to first main surface 12a that is exposed at a corresponding one of first and second side surfaces 12c and 12d of multilayer body 12. In this case, more specifically, a length d3 is preferably about 5 μm or more and about 100 μm or less, in which length d3 extends between an end portion of each of third and fourth external electrodes 30c and 30d in stacking direction x of multilayer body 12 and an end portion of second internal electrode layer 16b in stacking direction x of multilayer body 12 that is exposed at a corresponding one of first and second side surfaces 12c and 12d of multilayer body 12.

By disposing third external electrode 30c and fourth external electrode 30d as described above, the area where third external electrode 30c and fourth external electrode 30d cover multilayer body 12 can be reduced while maintaining the reliability of electrical connection between second internal electrode layer 16b and each of third and fourth external electrodes 30c and 30d, so that heat can be further dissipated.

External electrode 30 includes an underlying electrode layer 32 disposed on the surface of multilayer body 12 and a plating layer 34 disposed to cover underlying electrode layer 32. Underlying electrode layer 32 includes a first underlying electrode layer 32a, a second underlying electrode layer 32b, a third underlying electrode layer 32c, and a fourth underlying electrode layer 32d.

Plating layer 34 includes a first plating layer 34a, a second plating layer 34b, a third plating layer 34c, and a fourth plating layer 34d.

In other words, first external electrode 30a includes first underlying electrode layer 32a and first plating layer 34a. Second external electrode 30b includes second underlying electrode layer 32b and second plating layer 34b. Third external electrode 30c includes third underlying electrode layer 32c and third plating layer 34c. Fourth external electrode 30d includes fourth underlying electrode layer 32d and fourth plating layer 34d.

First underlying electrode layer 32a is disposed on the surface of first end surface 12e of multilayer body 12 and formed to extend from first end surface 12e to cover a portion of first main surface 12a, a portion of second main surface 12b, a portion of first side surface 12c, and a portion of second side surface 12d.

Second underlying electrode layer 32b is disposed on the surface of second end surface 12f of multilayer body 12 and formed to extend from second end surface 12f to cover a portion of first main surface 12a, a portion of second main surface 12b, a portion of first side surface 12c, and a portion of second side surface 12d.

Note that first underlying electrode layer 32a may be disposed only on the surface of first end surface 12e of multilayer body 12, and second underlying electrode layer 32b may be disposed only on the surface of second end surface 12f of multilayer body 12.

Third underlying electrode layer 32c is disposed on the surface of first side surface 12c of multilayer body 12 and formed to extend from first side surface 12c to cover second main surface 12b.

Fourth underlying electrode layer 32d is disposed on the surface of second side surface 12d of multilayer body 12 and formed to extend from second side surface 12d to cover second main surface 12b.

Underlying electrode layer 32 includes at least one selected from a baked layer, a conductive resin layer, a thin film layer, and the like.

The following describes the configurations in which underlying electrode layer 32 is formed as a baked layer, a conductive resin layer, and a thin film layer as described above.

Baked Layer

The baked layer includes a glass component and a metal component. The glass component of the baked layer includes at least one selected from B, Si, Ba, Mg, Al, Li, and the like. The metal component of the baked layer includes, for example, at least one selected from Cu, Ni, Ag, Pd, an Ag—Pd alloy, Au, and the like. Also, a plurality of baked layers may be provided. The baked layer is formed by applying a conductive paste including a glass component and a metal component onto multilayer body 12 and firing it. The baked layer may be formed by firing the stacked chip including internal electrode layer 16 and dielectric layer 14 simultaneously with the conductive paste applied onto the stacked chip, or may be formed by firing the stacked chip including internal electrode layer 16 and dielectric layer 14 to obtain multilayer body 12 onto which a conductive paste is applied and then baked. When the baked layer is obtained by firing the stacked chip including internal electrode layer 16 and dielectric layer 14 simultaneously with the conductive paste applied onto the stacked chip, the baked layer is preferably formed by baking a material additionally including a dielectric material in place of a glass component.

The thickness of first underlying electrode layer 32a located on first end surface 12e, in length direction z connecting first and second end surfaces 12e and 12f, and at the center of first underlying electrode layer 32a in stacking direction x is preferably about 20 μm or more and about 50 μm or less.

Further, the thickness of second underlying electrode layer 32b located on second end surface 12f, in length direction z connecting first and second end surfaces 12e and 12f, and at the center of second underlying electrode layer 32b in stacking direction x is preferably about 20 μm or more and about 50 μm or less.

In the case where first underlying electrode layer 32a is provided on a portion of first main surface 12a, a portion of second main surface 12b, a portion of first side surface 12c, and a portion of second side surface 12d, the thickness of first underlying electrode layer 32a located on each of first and second main surfaces 12a and 12b, in stacking direction x connecting first and second main surfaces 12a and 12b, and at the center of first underlying electrode layer 32a in length direction z connecting first and second end surfaces 12e and 12f is preferably about 5 μm or more and about 20 μm or less, for example. Further, the thickness of first underlying electrode layer 32a located on each of first and second side surfaces 12c and 12d, in width direction y connecting first and second side surfaces 12c and 12d, and at the center of first underlying electrode layer 32a in length direction z connecting first and second end surfaces 12e and 12f is preferably about 5 μm or more and about 20 μm or less, for example.

In the case where second underlying electrode layer 32b is provided on a portion of first main surface 12a, a portion of second main surface 12b, a portion of first side surface 12c, and a portion of second side surface 12d, the thickness of second underlying electrode layer 32b located on each of first and second main surfaces 12a and 12b, in stacking direction x connecting first and second main surfaces 12a and 12b, and at the center of second underlying electrode layer 32b in length direction z connecting first and second end surfaces 12e and 12f is preferably about 5 μm or more and about 20 μm or less, for example. Further, the thickness of second underlying electrode layer 32b located on each of first and second side surfaces 12c and 12d, in width direction y connecting first and second side surfaces 12c and 12d, and at the center of second underlying electrode layer 32b in length direction z connecting first and second end surfaces 12e and 12f is preferably about 5 μm or more and about 20 μm or less, for example.

The thickness of third underlying electrode layer 32c located on first side surface 12c, in width direction y connecting first and second side surfaces 12c and 12d, and at the center of third underlying electrode layer 32c in length direction z connecting first and second end surfaces 12e and 12f is preferably about 20 μm or more and about 40 μm or less, for example.

Further, the thickness of fourth underlying electrode layer 32d located on second side surface 12d, in width direction y connecting first and second side surfaces 12c and 12d, and at the center of fourth underlying electrode layer 32d in length direction z connecting first and second end surfaces 12e and 12f is preferably about 20 μm or more and about 40 μm or less, for example.

The thickness of third underlying electrode layer 32c located on second main surface 12b, in stacking direction x connecting first and second main surfaces 12a and 12b, and at the center of third underlying electrode layer 32c in length direction z connecting first and second end surfaces 12e and 12f is preferably about 5 μm or more and about 20 μm or less, for example.

The thickness of fourth underlying electrode layer 32d located on second main surface 12b, in stacking direction x connecting first and second main surfaces 12a and 12b, and at the center of fourth underlying electrode layer 32d in length direction z connecting first and second end surfaces 12e and 12f is preferably about 5 μm or more and about 20 μm or less, for example.

Conductive Resin Layer

The conductive resin layer may be disposed on the baked layer so as to cover the baked layer, or may be disposed directly on multilayer body 12 without providing a baked layer. The conductive resin layer may completely cover the baked layer or may partially cover the baked layer. Further, a plurality of conductive resin layers may be provided.

The conductive resin layer includes a thermosetting resin and metal(s). The conductive resin layer includes a thermosetting resin and therefore is more flexible than a baked layer, for example, made of a fired product of a conductive paste or a plating film. Thus, even when multilayer ceramic capacitor 10 receives a physical impact or an impact caused by a thermal cycle, the conductive resin layer functions as a shock-absorbing layer and thereby can prevent cracking from occurring in multilayer ceramic capacitor 10.

As the metal contained in the conductive resin layer, Ag, Cu, Ni, Sn, Bi, or an alloy including these metals can be used. Further, powdery metals each having a surface coated with Ag can also be used. When powdery metals each having a surface coated with Ag are used, Cu, Ni, Sn, Bi or an alloy powder thereof is preferably used as powdery metals. The reason why the conductive powdery metals of Ag are used as conductive metal is because Ag is lowest in specific resistance among metals and therefore is suitable for an electrode material, because Ag is a noble metal and therefore is not oxidized and exhibits a high weather resistance, and also because an inexpensive metal can be used for the base material while maintaining the above-described characteristics of Ag.

Further, as the metal contained in the conductive resin layer, a metal obtained by subjecting Cu or Ni to an antioxidant treatment can also be used. As the metal contained in the conductive resin layer, powdery metals each having a surface coated with Sn, Ni, or Cu can also be used. When powdery metals each having a surface coated with Sn, Ni, or Cu are used, Ag, Cu, Ni, Sn, Bi, or an alloy powder thereof is preferably used as powdery metals.

The metal contained in the conductive resin layer is responsible mainly for electrical conductivity of the conductive resin layer. Specifically, electrically conductive fillers come into contact with each other to thereby form an electrical path inside the conductive resin layer.

The metal contained in the conductive resin layer may have a spherical shape, a flat shape or the like, but it is preferable to use a mixture of spherical-shaped powdery metals and flat-shaped powdery metals.

Examples of the resin for the conductive resin layer usable herein include various known thermosetting resins such as an epoxy resin, a phenol resin, an urethane resin, a silicone resin, or a polyimide resin. Among them, the epoxy resin excellent in heat resistance, moisture resistance, adhesiveness, and the like is one of the most appropriate resins.

Further, the conductive resin layer preferably includes a curing agent together with the thermosetting resin. When the epoxy resin is used as a base resin, examples of the curing agent for the epoxy resin usable herein include various known compounds such as a phenol-based compound, an amine-based compound, an acid anhydride-based compound, an imidazole-based compound, an active ester-based compound, or an amide-imide-based compound.

The thickest portion of the conductive resin layer preferably has a thickness of about 20 μm or more and about 70 μm or less, for example.

Thin Film Layer

When a thin film layer is provided as underlying electrode layer 32, the thin film layer is formed by a thin film forming method such as a sputtering method or a vapor deposition method such that metal particles are deposited to form a layer of about 1 μm or less.

Plating layer 34 is disposed to cover underlying electrode layer 32.

Plating layer 34 includes at least one selected, for example, from Cu, Ni, Sn, Ag, Pd, an Ag—Pd alloy, Au, and the like. Plating layer 34 may include a plurality of layers. In this case, plating layer 34 preferably has a two-layer structure of Ni plating and Sn plating. The Ni plating layer is used to prevent underlying electrode layer 32 from being eroded by solder used when multilayer ceramic capacitor 10 is mounted. The Sn plating layer is used to improve the solderability in mounting multilayer ceramic capacitor 10, to thereby allow easy mounting. The thickness per layer of plating layer 34 is preferably about 1 μm or more and about 6 μm or less, for example.

Note that external electrode 30 may be formed only of a plating layer without providing underlying electrode layer 32. Although not shown, the following describes the structure in which a plating layer is provided without providing underlying electrode layer 32.

One or each of first external electrode 30a, second external electrode 30b, third external electrode 30c, and fourth external electrode 30d may be formed such that a plating layer is formed directly on the surface of multilayer body 12 without providing underlying electrode layer 32. In other words, multilayer ceramic capacitor 10 may have a structure including a plating layer electrically connected to first internal electrode layer 16a and second internal electrode layer 16b. In such a case, the plating layer may be formed after a catalyst is disposed on the surface of multilayer body 12 as pretreatment.

When the plating layer is formed directly on multilayer body 12 without providing underlying electrode layer 32, reduction in thickness of underlying electrode layer 32 can be translated into a lower profile, i.e., a decrease in thickness, or into a thickness of multilayer body 12, i.e., a thickness of effective layer portion 18. Thus, the degree of freedom in designing a thin chip can be improved.

The plating layer preferably includes a lower plating electrode formed on the surface of multilayer body 12 and an upper plating electrode formed on the surface of the lower plating electrode. Each of the lower plating electrode and the upper plating electrode preferably includes, for example, at least one metal selected from Cu, Ni, Sn, Pb, Au, Ag, Pd, Bi, Zn, or the like, or an alloy including the metal(s). Further, the lower plating electrode is preferably formed of Ni having solder barrier performance, and the upper plating electrode is preferably formed of Sn or Au excellent in solderability.

Further, for example, when first internal electrode layer 16a and second internal electrode layer 16b each are formed of Ni, the lower plating electrode is preferably formed of Cu that is well joined to Ni. The upper plating electrode should only be formed as required, and each of first external electrode 30a, second external electrode 30b, third external electrode 30c, and fourth external electrode 30d may be formed only from the lower plating electrode. In the plating layer, the upper plating electrode may be provided as an outermost layer, or another plating electrode may be further formed on the surface of the upper plating electrode.

In this case, when external electrode 30 is formed only of a plating layer without providing underlying electrode layer 32, the thickness per layer of the plating layer disposed without providing underlying electrode layer 32 is preferably about 1 μm or more and about 15 μm or less.

Further, the plating layer preferably includes no glass. The proportion of metal per unit volume of the plating layer is preferably about 99 vol % or more.

The dimension in length direction z of multilayer ceramic capacitor 10 including multilayer body 12 and external electrode 30 is defined as a dimension L. Dimension L is preferably about 1.0 mm or more and about 1.7 mm or less, for example.

The dimension in stacking direction x of multilayer ceramic capacitor 10 including multilayer body 12 and external electrode 30 is defined as a dimension T. Dimension T is preferably about 0.3 mm or more and about 0.7 mm or less, for example.

The dimension in width direction y of multilayer ceramic capacitor 10 including multilayer body 12 and external electrode 30 is defined as a dimension W. Dimension W is preferably about 0.5 mm or more and about 0.9 mm or less, for example.

In multilayer ceramic capacitor 10 shown in FIG. 1, second internal electrode layer 16b located closest to first main surface 12a in second region 28b of multilayer body 12 is located within a range from second main surface 12b to one third of multilayer body 12 in stacking direction x. As a result, the current path to mounting substrate 50 is shortened, so that the ESL can be reduced.

Further, in multilayer ceramic capacitor 10 shown in FIG. 1, the area where third external electrode 30c and fourth external electrode 30d cover multilayer body 12 can be reduced as compared with the conventional case, so that heat can be further dissipated.

2. Mounting Structure of Multilayer Ceramic Capacitor

Figure 10:
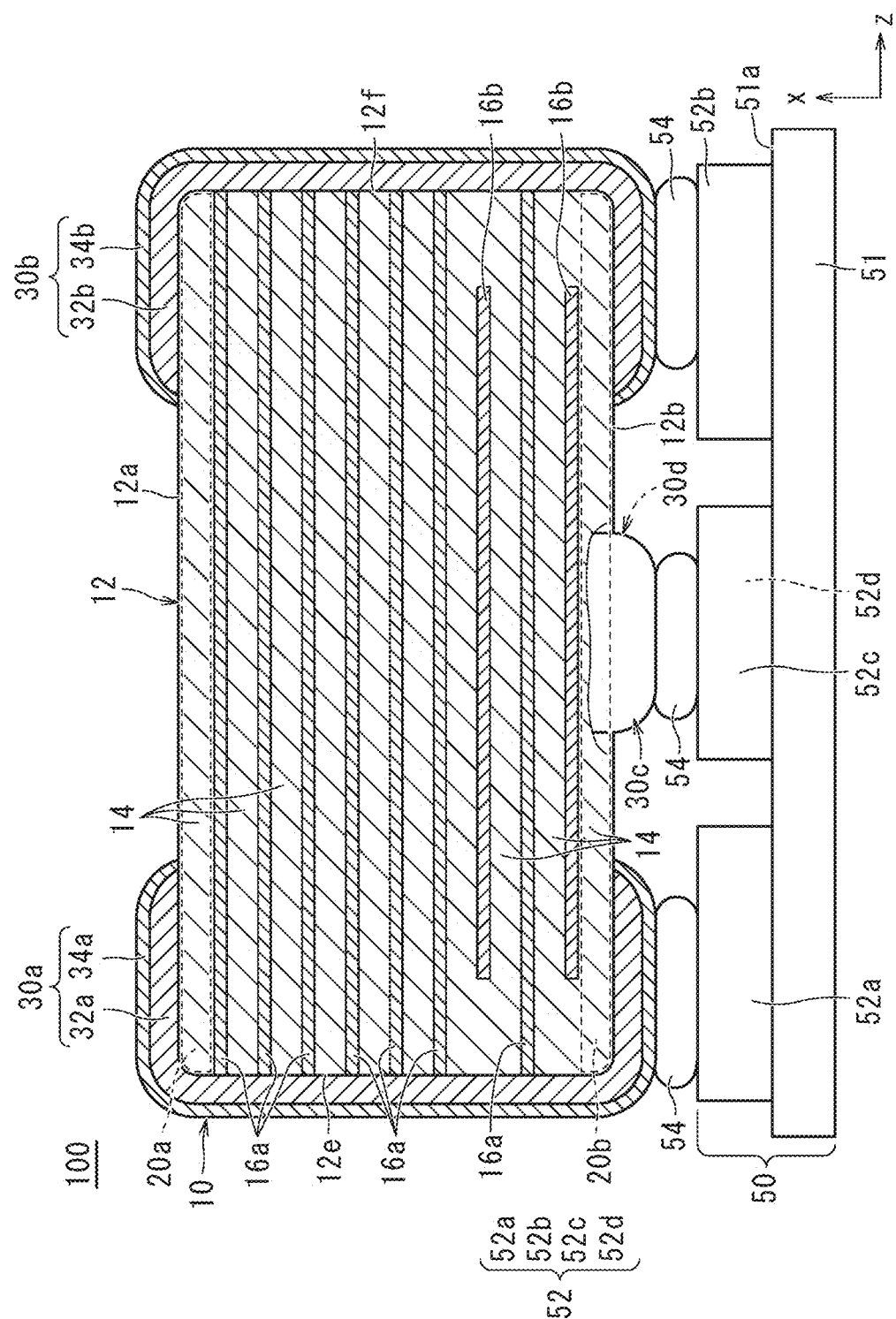
FIG. 10 is a cross-sectional view taken in a length direction and showing an example of a mounting structure of the multilayer ceramic capacitor according to the first preferred embodiment of the present invention.
Figure 11:
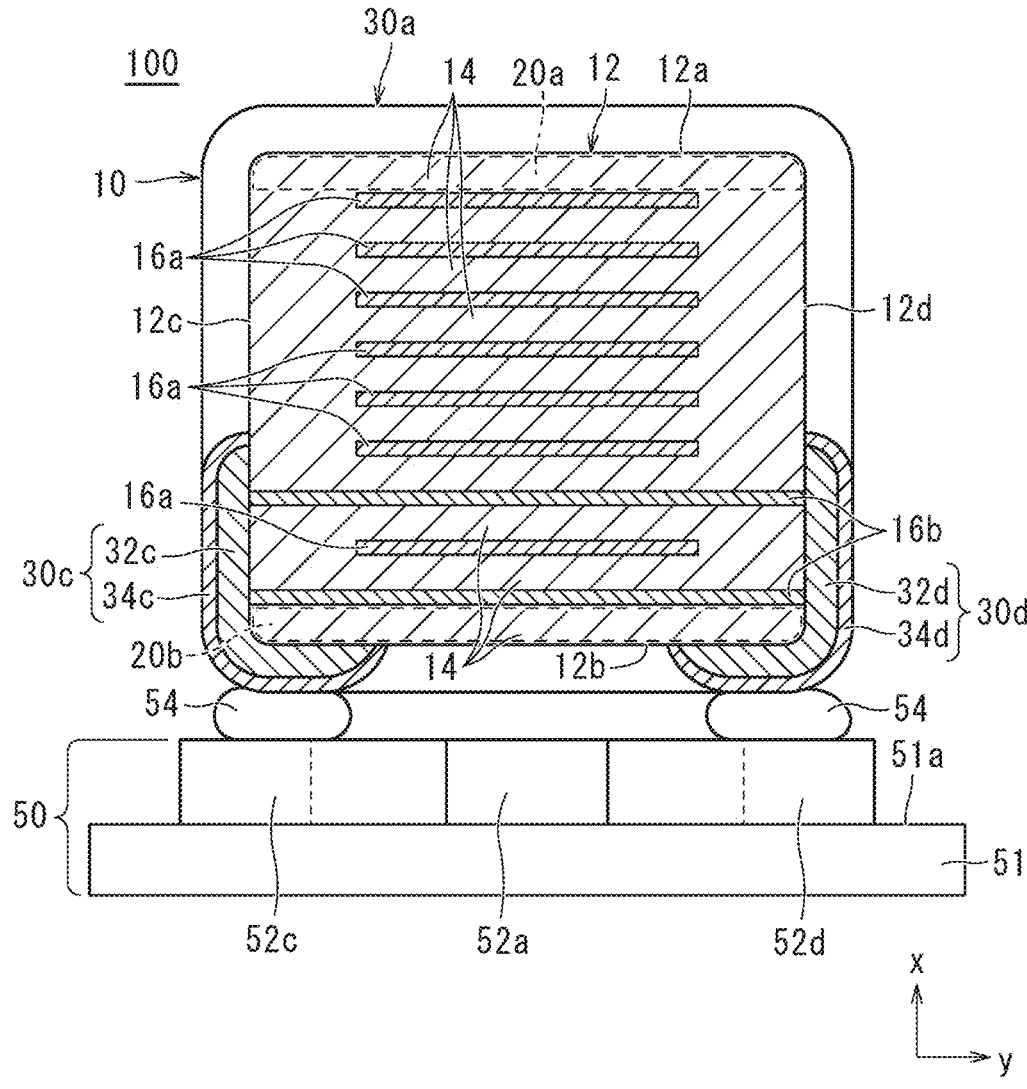
FIG. 11 is a cross-sectional view taken in a width direction and showing an example of the mounting structure of the multilayer ceramic capacitor according to the first preferred embodiment of the present invention.

The following describes the mounting structure of the multilayer ceramic capacitor according to the first preferred embodiment of the present invention with reference to FIGS. 10 and 11.

As shown in FIGS. 10 and 11, a mounting structure 100 of the multilayer ceramic capacitor according to the first preferred embodiment includes multilayer ceramic capacitor 10 and mounting substrate 50 according to the first preferred embodiment. Mounting substrate 50 includes a core member 51 and a conductor land 52 of the substrate. Core member 51 of the substrate is formed, for example, from a substrate made of a material obtained by impregnating a mixed base material of a glass fabric (cloth) and a glass nonwoven fabric with an epoxy resin or a polyimide resin, or formed from a ceramic body manufactured by baking a sheet obtained by mixing ceramics and glass. Note that core member 51 of the substrate may be a single-layer substrate or may be a substrate formed by stacking a plurality of layers.

The thickness of core member 51 of the substrate is not particularly limited but is preferably about 200 μm or more and about 800 μm or less, for example.

One of the main surfaces of core member 51 of the substrate is provided with conductor land 52 and defines a substrate-side mounting surface 51a serving as a mounting surface of multilayer ceramic capacitor 10.

Conductor land 52 includes a first conductor land 52a, a second conductor land 52b, a third conductor land 52c, and a fourth conductor land 52d.

First conductor land 52a is electrically connected and mechanically bonded by a bonding material 54 to first external electrode 30a of multilayer ceramic capacitor 10. Second conductor land 52b is electrically connected and mechanically bonded by bonding material 54 to second external electrode 30b of multilayer ceramic capacitor 10. Third conductor land 52c is electrically connected and mechanically bonded by bonding material 54 to third external electrode 30c of multilayer ceramic capacitor 10. Fourth conductor land 52d is electrically connected and mechanically bonded by bonding material 54 to fourth external electrode 30d of multilayer ceramic capacitor 10.

Note that conductor land 52 may be provided on the main surface of core member 51 of the substrate on the side opposite to substrate-side mounting surface 51a.

The material of conductor land 52 is not particularly limited but may be formed, for example, of metal such as copper, gold, palladium, or platinum. Further, the thickness of conductor land 52, i.e., the dimension in stacking direction x, is not particularly limited but is preferably about 20 μm or more and about 200 μm or less, for example. Bonding material 54 can be formed, for example, of an epoxy-based adhesive for high heat resistance.

In the above description, mounting substrate 50 corresponds to a mounting substrate according to a preferred embodiment of the present invention. Core member 51 of the substrate corresponds to a core of a substrate according to a preferred embodiment of the present invention. Substrate-side mounting surface 51a corresponds to a mounting surface according to a preferred embodiment of the present invention. The plurality of conductor lands 52 correspond to a plurality of connection conductors according to a preferred embodiment of the present invention. However, the connection conductors according to preferred embodiments of the present invention is not limited by other purposes, functions, shapes, names, and the like as long as it is provided as, in addition to what is called a land, a conductor disposed between the multilayer ceramic capacitor and the mounting substrate to allow electrical connection therebetween.

Mounting structure 100 of the multilayer ceramic capacitor shown in FIGS. 10 and 11 is mounted on mounting substrate 50 such that second main surface 12b of multilayer ceramic capacitor 10 faces substrate-side mounting surface 51a. This implements electrical connection between multilayer ceramic capacitor 10 and mounting substrate 50 in the state in which the distance between substrate-side mounting surface 51a of mounting substrate 50 and each of first and second extending portions 27a and 27b respectively extending from first and second side surfaces 12c and 12d is minimized.

Accordingly, in mounting structure 100 of multilayer ceramic capacitor 10 shown in FIGS. 10 and 11, various functions of multilayer ceramic capacitor 10 according to the first preferred embodiment of the present invention described above are reflected as they are, and thus, the current path from second internal electrode layer 16b of multilayer ceramic capacitor 10 to mounting substrate 50 can be shortened as compared with the conventional case. As a result, various effects of multilayer ceramic capacitor 10 according to the first preferred embodiment of the present invention are reflected to achieve the effect of improving the low ESL characteristics in the mounting structure of the multilayer ceramic capacitor.

3. Method of Manufacturing Multilayer Ceramic Capacitor

The following describes a non-limiting example of a method of manufacturing multilayer ceramic capacitor 10 according to the first preferred embodiment of the present invention.

First, a dielectric sheet for dielectric layer and a conductive paste for internal electrode are prepared. The dielectric sheet and the conductive paste for internal electrode layer include a binder and a solvent, which may be a known binder and a known solvent.

The conductive paste for internal electrode layer is printed on the dielectric sheet in a prescribed pattern, for example, by screen printing or gravure printing. Thus, a dielectric sheet having a pattern of the first internal electrode layer formed thereon and a dielectric sheet having a pattern of the second internal electrode layer formed thereon are prepared. More specifically, a screen mask for printing the first internal electrode layer and a screen mask for printing the second internal electrode layer are separately prepared, and the patterns of the respective internal electrode layers can be printed using a printing machine capable of separately printing these two types of screen masks.

In this case, sheets having the first internal electrode layers printed thereon are stacked to form a portion to be provided as first region 28a. Further, sheets having the first internal electrode layers printed thereon and sheets having the second internal electrode layers printed thereon are alternately stacked to form a portion to be provided as second region 28b. At this time, the number of stacked sheets having the first internal electrode layers printed thereon is larger than the number of stacked sheets having the second internal electrode layers printed thereon.

Then, a prescribed number of dielectric sheets on which the patterns of the internal electrode layers are not printed are stacked to form a portion to be provided as first outer layer portion 20a on the first main surface 12a side. Then, the portion to be provided as first region 28a formed in the above-described process is stacked on the portion to be provided as first outer layer portion 20a. Then, the portion to be provided as second region 28b formed in the above-described process is stacked on the portion to be provided as first region 28a. Then, a prescribed number of dielectric sheets on which the patterns of the internal electrode layers are not printed are stacked on a portion to be provided as second region 28b, to form a portion to be provided as second outer layer portion 20b on the second main surface 12b side. This produces stacked sheets. In this case, by changing the order in which the portion to be provided as first region 28a and the portion to be provided as second region 28b are stacked, first region 28a and second region 28b can be arranged at desired positions.

Then, the stacked sheets are pressed in the stacking direction by, for example, hydrostatic pressing to produce a stacked block.

Then, the stacked block is cut into a prescribed size to cut out stacked chips. At this time, the corners and the ridges of each stacked chip may be rounded by barrel polishing or the like.

Then, the cut-out stacked chip is fired to produce multilayer body 12. The firing temperature, which depends on the materials of dielectric layer 14 and internal electrode layer 16, is preferably about 900° C. or higher and about 1400° C. or lower.

Underlying Electrode Layer

Subsequently, third underlying electrode layer 32c of third external electrode 30c is formed on first side surface 12c of multilayer body 12 obtained by firing, and fourth underlying electrode layer 32d of fourth external electrode 30d is formed on second side surface 12d of multilayer body 12.

When a baked layer is formed as underlying electrode layer 32, a conductive paste including a glass component and a metal component is applied and then baked to thereby form a baked layer as underlying electrode layer 32. The baking temperature at this time is preferably about 700° C. or higher and about 900° C. or lower, for example. In the present preferred embodiment, underlying electrode layer 32 is formed of a baked layer.

In this case, various methods can be used as a method of forming a baked layer. Example of the method used herein include a method of adjusting the direction of multilayer body 12 by a camera or a magnet such that second main surface 12b is located below, and then holding multilayer body 12 with a holding jig and extruding the conductive paste through a slit or a hole so to be applied. In the case of the above-described method, by increasing the extrusion amount of the conductive paste, third underlying electrode layer 32c and fourth underlying electrode layer 32d can be formed not only on second main surface 12b but also on a portion of first side surface 12c and a portion of second side surface 12d so as to cover second internal electrode layer 16b exposed at first side surface 12c and second side surface 12d.

Then, first underlying electrode layer 32a of first external electrode 30a is formed on first end surface 12e of multilayer body 12 obtained by firing, and second underlying electrode layer 32b of second external electrode 30b is formed on second end surface 12f of multilayer body 12. In the present preferred embodiment, first underlying electrode layer 32a and second underlying electrode layer 32b are formed by a DIP method so as to extend not only to reach first end surface 12e and second end surface 12f but also to reach a portion of first main surface 12a, a portion of second main surface 12b, a portion of first side surface 12c, and a portion of second side surface 12d.

In the baking treatment, first underlying electrode layer 32a of first external electrode 30a, second underlying electrode layer 32b of second external electrode 30b, third underlying electrode layer 32c of third external electrode 30c, and fourth underlying electrode layer 32d of fourth external electrode 30d may be simultaneously baked, or first underlying electrode layer 32a of first external electrode 30a, second underlying electrode layer 32b of second external electrode 30b, third underlying electrode layer 32c of third external electrode 30c, and fourth underlying electrode layer 32d of fourth external electrode 30d may be separately baked.

Conductive Resin Layer

When underlying electrode layer 32 is formed of a conductive resin layer, the conductive resin layer can be formed by the following method. Note that the conductive resin layer may be formed on the surface of the baked layer, or the conductive resin layer may alone be directly formed on multilayer body 12 without forming the baked layer.

As a method of forming a conductive resin layer, a conductive resin paste including a thermosetting resin and a metal component is applied on the baked layer or multilayer body 12, and subjected to heat treatment at a temperature of about 250° C. or higher and about 550° C. or lower to thermally cure the resin to thereby form a conductive resin layer. At this time, the atmosphere during the heat treatment is preferably an N2 atmosphere. In order to prevent scattering of the resin and to prevent oxidation of various metal components, the oxygen concentration is preferably suppressed to be about 100 ppm or less, for example.

Examples of the method of applying a conductive resin paste may include a method of extruding the conductive resin paste through a slit so as to be applied, similarly to the method of forming underlying electrode layer 32 with a baked layer.

Thin Film Layer

When underlying electrode layer 32 is formed of a thin film layer, masking or the like is performed, and thereby, underlying electrode layer 32 can be formed by a thin film forming method such as a sputtering method or a vapor deposition method at a position where external electrode 30 is desired to be formed. Underlying electrode layer 32 formed of a thin film layer is provided such that metal particles are deposited to form a layer of 1 μm or less.

Plating Layer

Further, external electrode 30 may be formed only of a plating layer without providing underlying electrode layer 32. In this case, external electrode 30 can be formed by the following method.

First end surface 12e and second end surface 12f of multilayer body 12 are plated to form a lower plating electrode in the portion where first internal electrode layer 16a is exposed. Similarly, first side surface 12c and second side surface 12d of multilayer body 12 are plated to form a lower plating electrode in the portion where second internal electrode layer 16b is exposed. In the plating treatment, either electrolytic plating or electroless plating may be adopted, but electroless plating requires a pretreatment with a catalyst or the like in order to improve the plating precipitation speed, which disadvantageously complicates the process. Thus, it is usually preferable to use electrolytic plating. As a plating method, barrel plating is preferably used. Further, an upper plating electrode formed on the surface of the lower plating electrode may be similarly formed as required.

Finally, plating layer 34 is formed. Plating layer 34 may be formed on the surface of underlying electrode layer 32 or may be formed directly on multilayer body 12. In the present preferred embodiment, plating layer 34 is formed on the surface of underlying electrode layer 32. More specifically, an Ni plating layer as a lower plating layer and an Sn plating layer as an upper plating layer are formed on underlying electrode layer 32. In the plating treatment, either electrolytic plating or electroless plating may be adopted. However, electroless plating requires a pretreatment with a catalyst or the like in order to improve the plating precipitation speed, which disadvantageously complicates the process. Thus, it is usually preferable to use electrolytic plating.

Multilayer ceramic capacitor 10 according to the present preferred embodiment is manufactured as described above.

B. Second Preferred Embodiment

Figure 12:
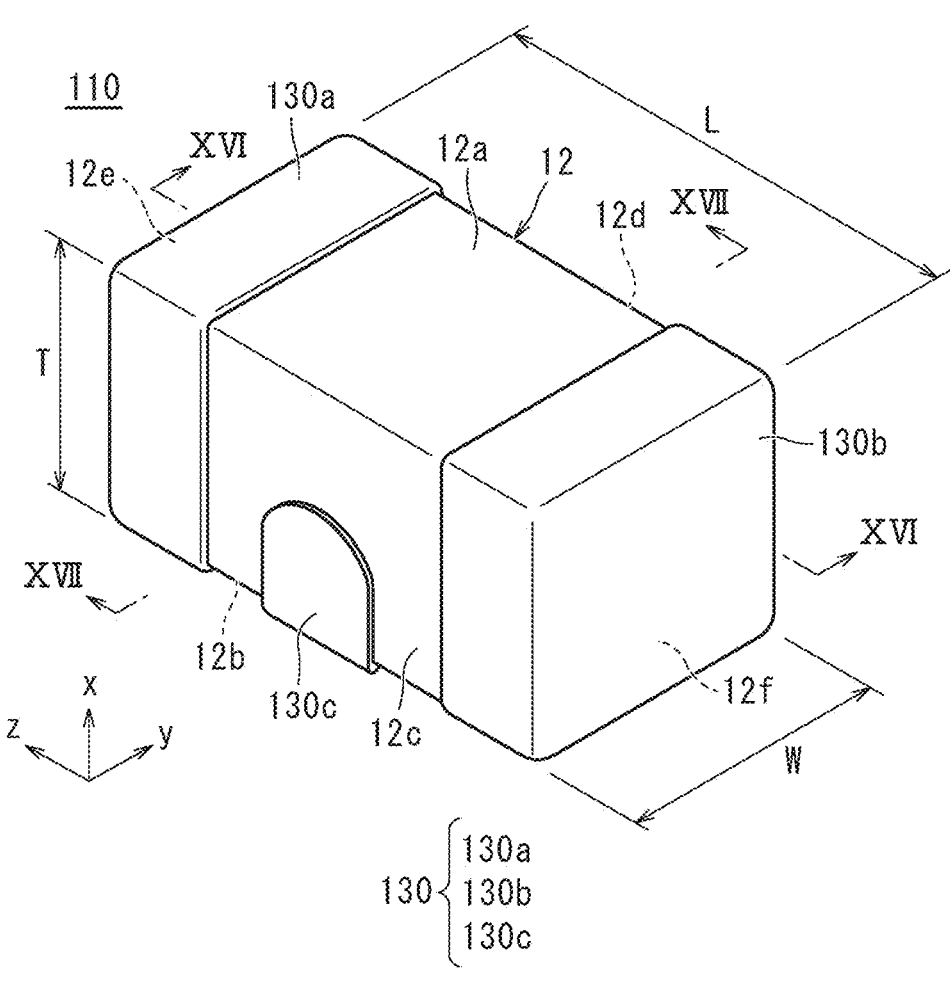
FIG. 12 is an external perspective view showing an example of a multilayer ceramic capacitor according to a second preferred embodiment of the present invention.
Figure 13:
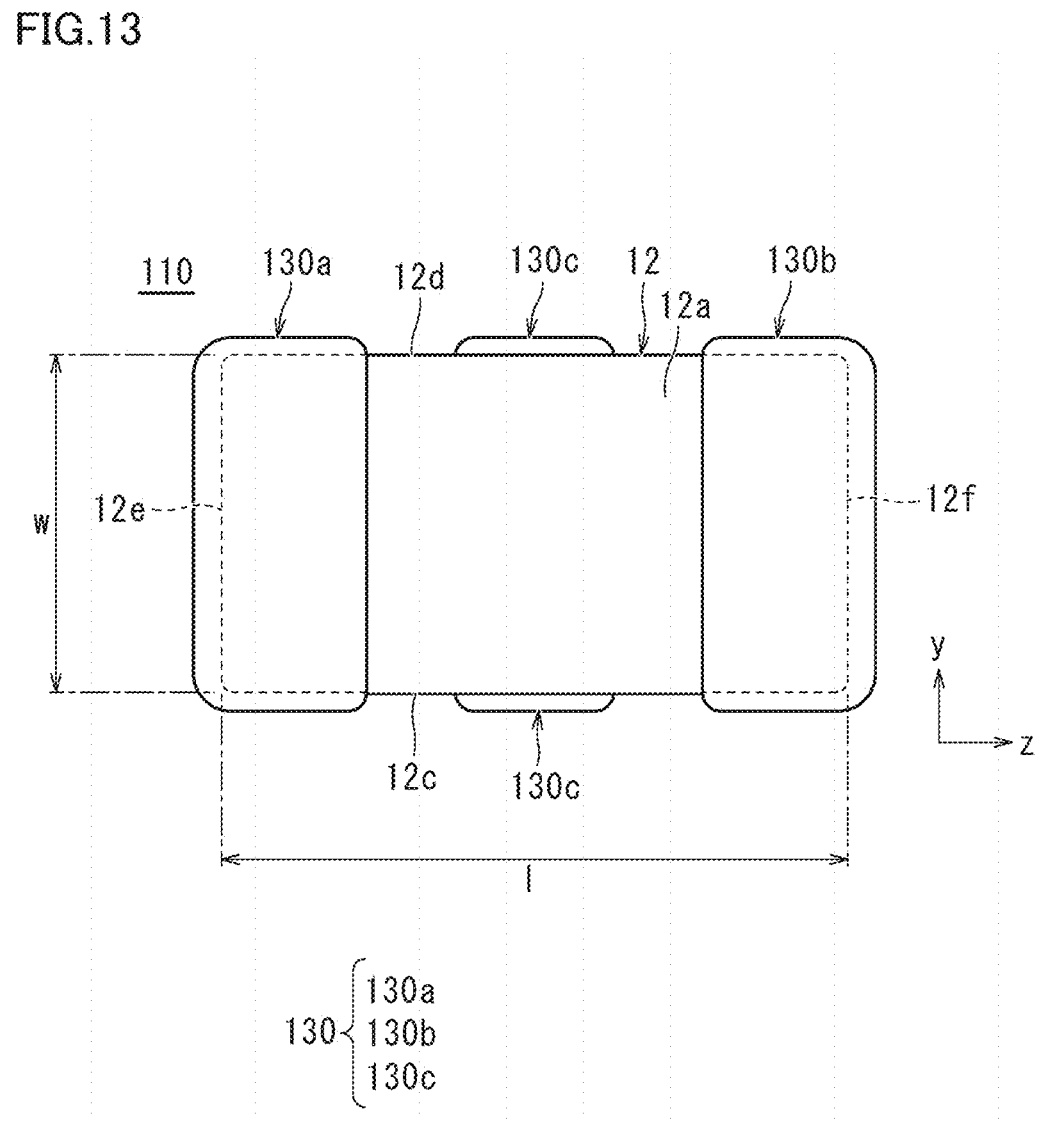
Figure 14:
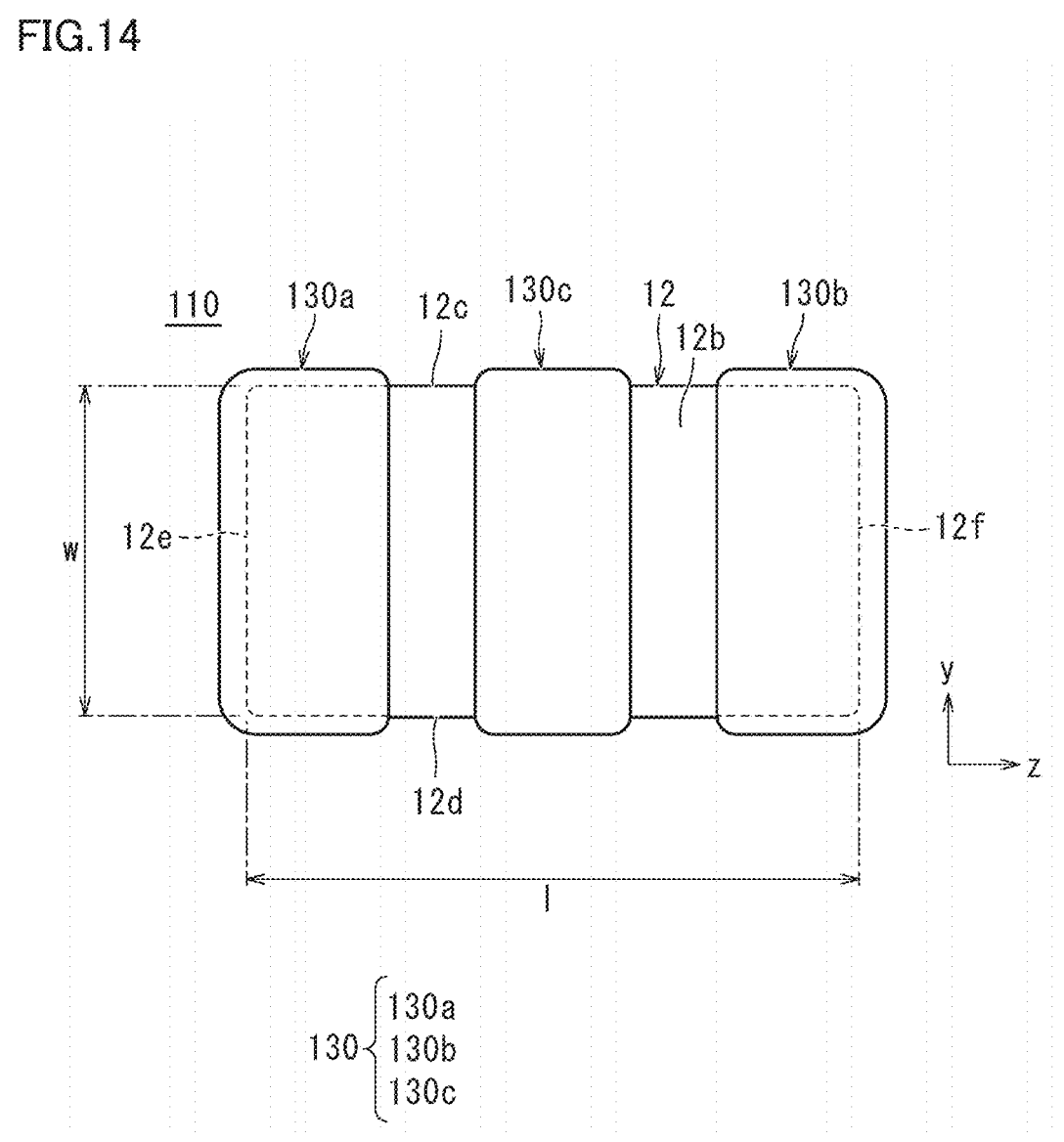
Figure 15:
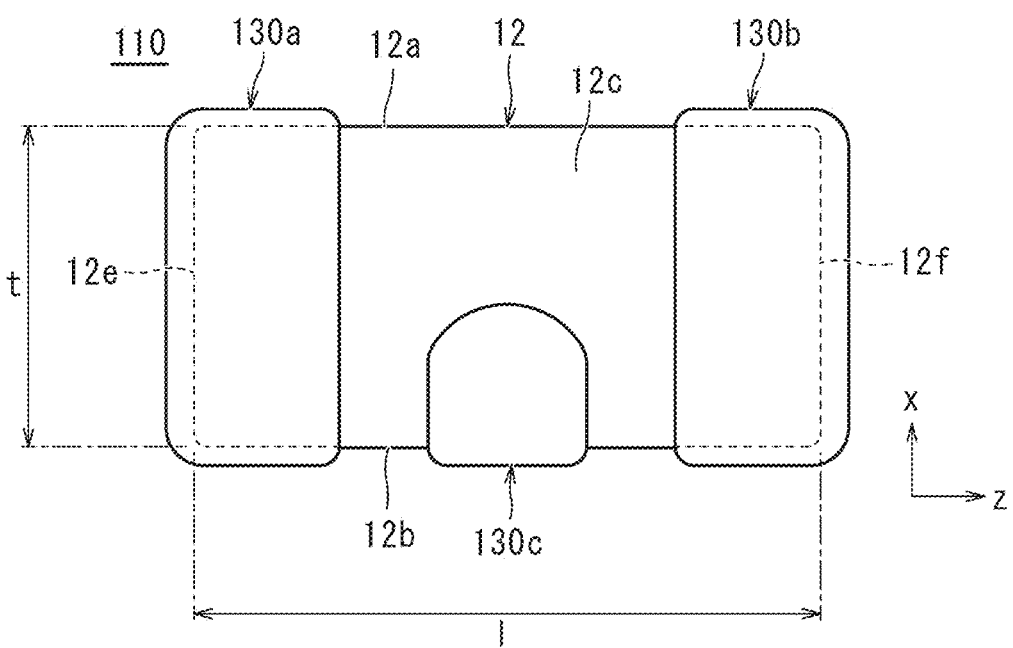
FIG. 15 is a side view showing an example of the multilayer ceramic capacitor according to the second preferred embodiment of the present invention.
Figure 16:
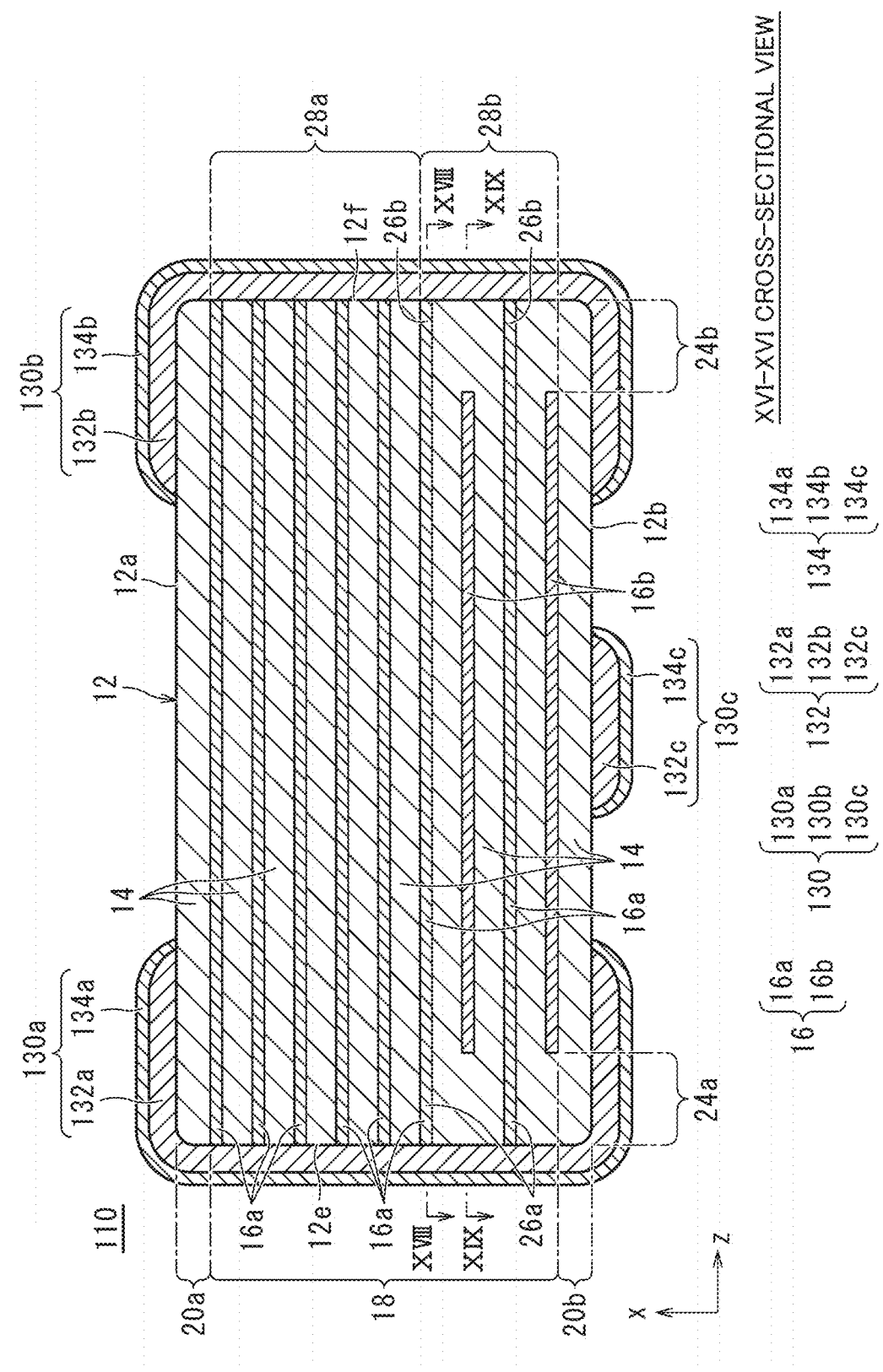
FIG. 16 is a cross-sectional view taken along a line XVI-XVI in FIG. 12.
Figure 17:
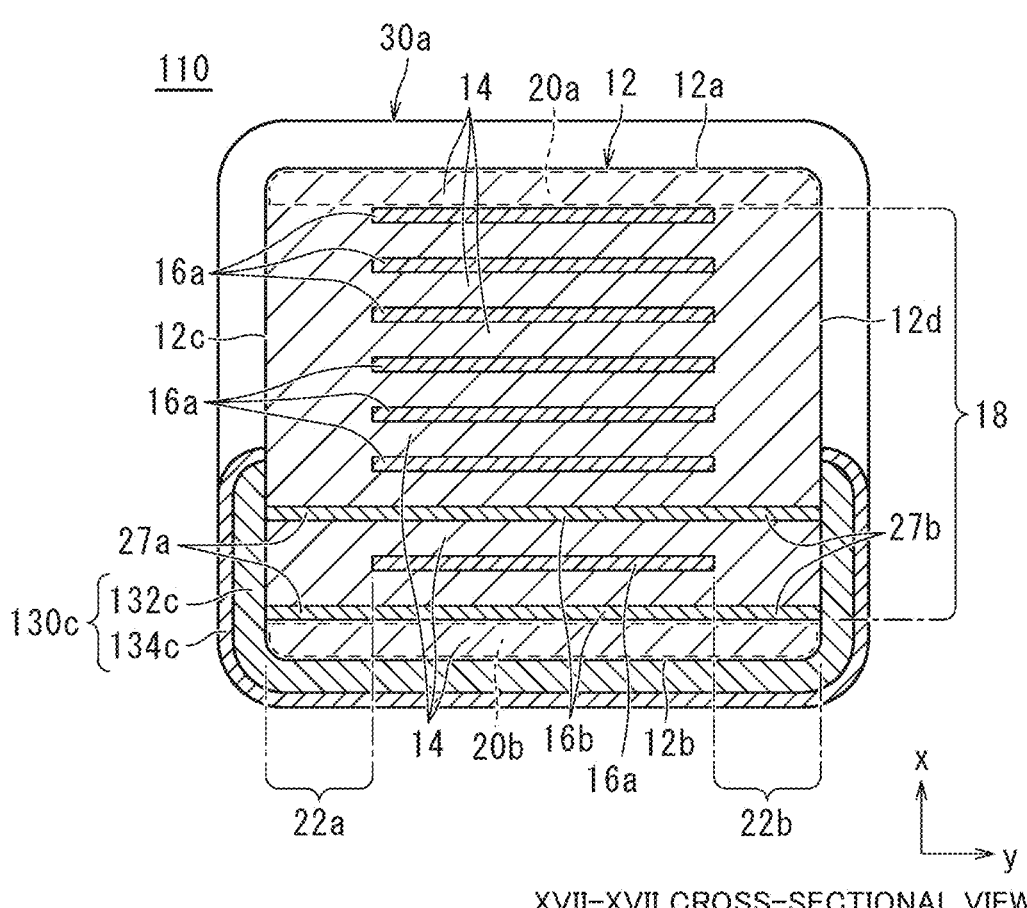
FIG. 17 is a cross-sectional view taken along a line XVII-XVII in FIG. 12.
Figure 18:
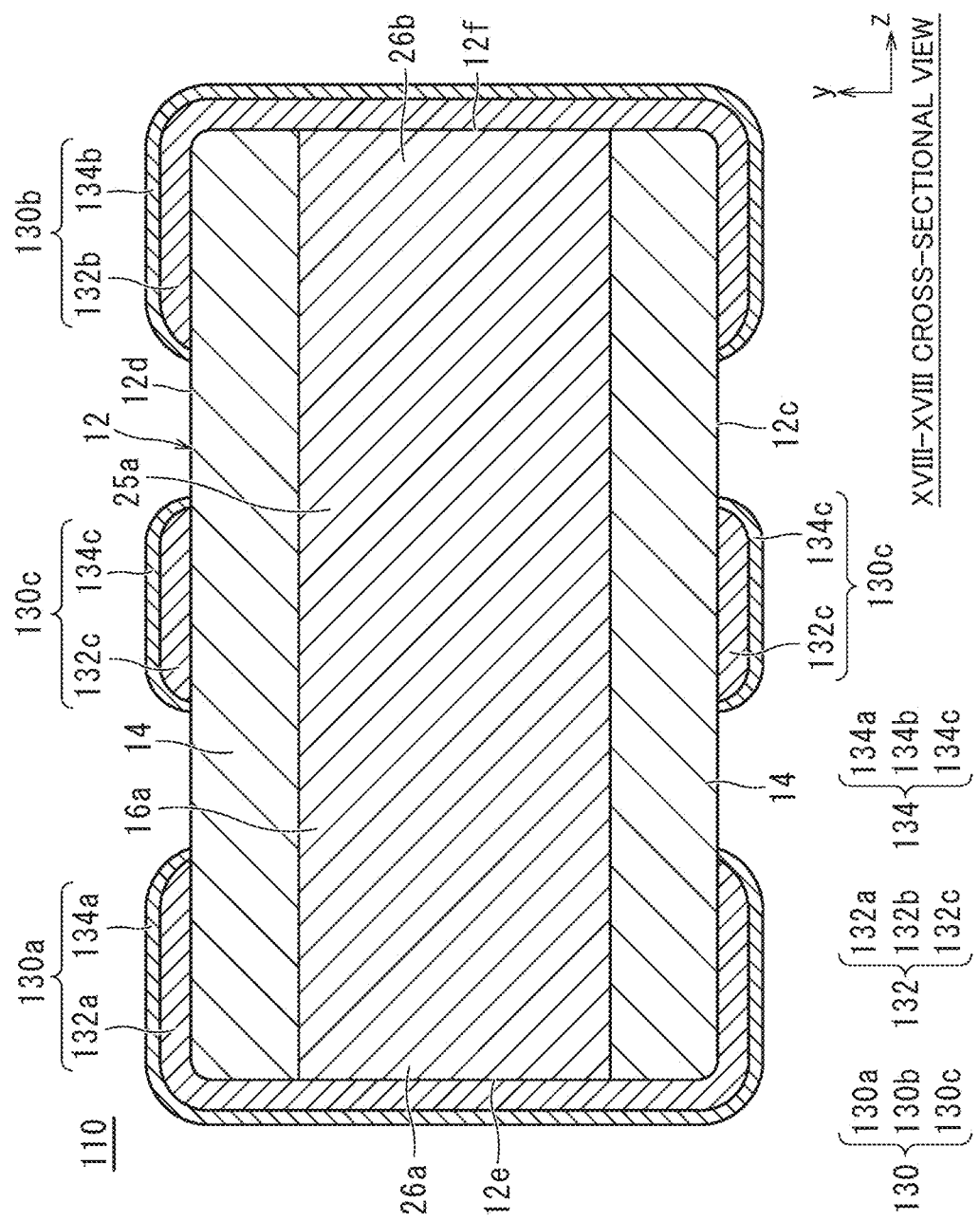
FIG. 18 is a cross-sectional view taken along a line XVIII-XVIII in FIG. 16.
Figure 19:
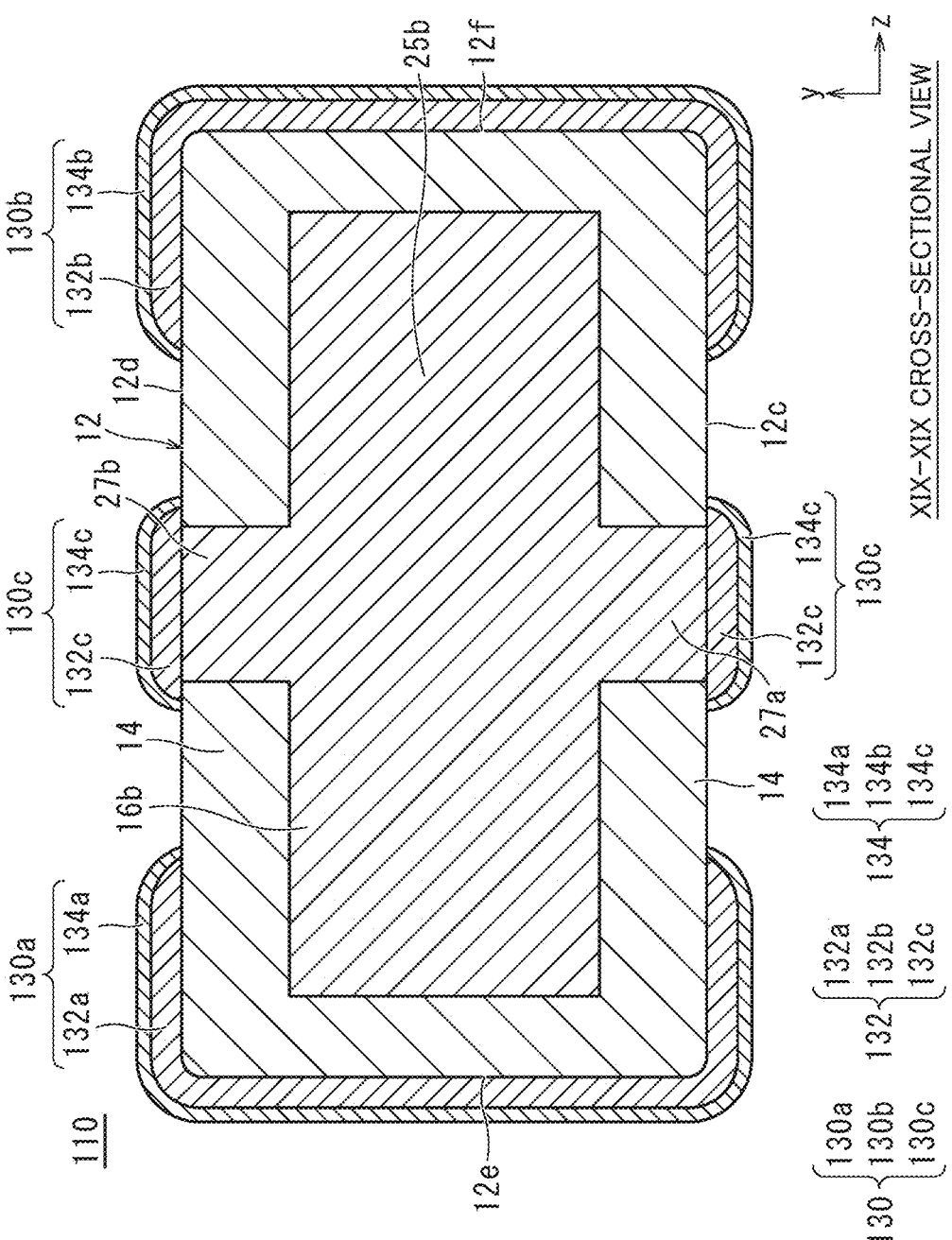
FIG. 19 is a cross-sectional view taken along a line XIX-XIX in FIG. 16.
Figure 20:
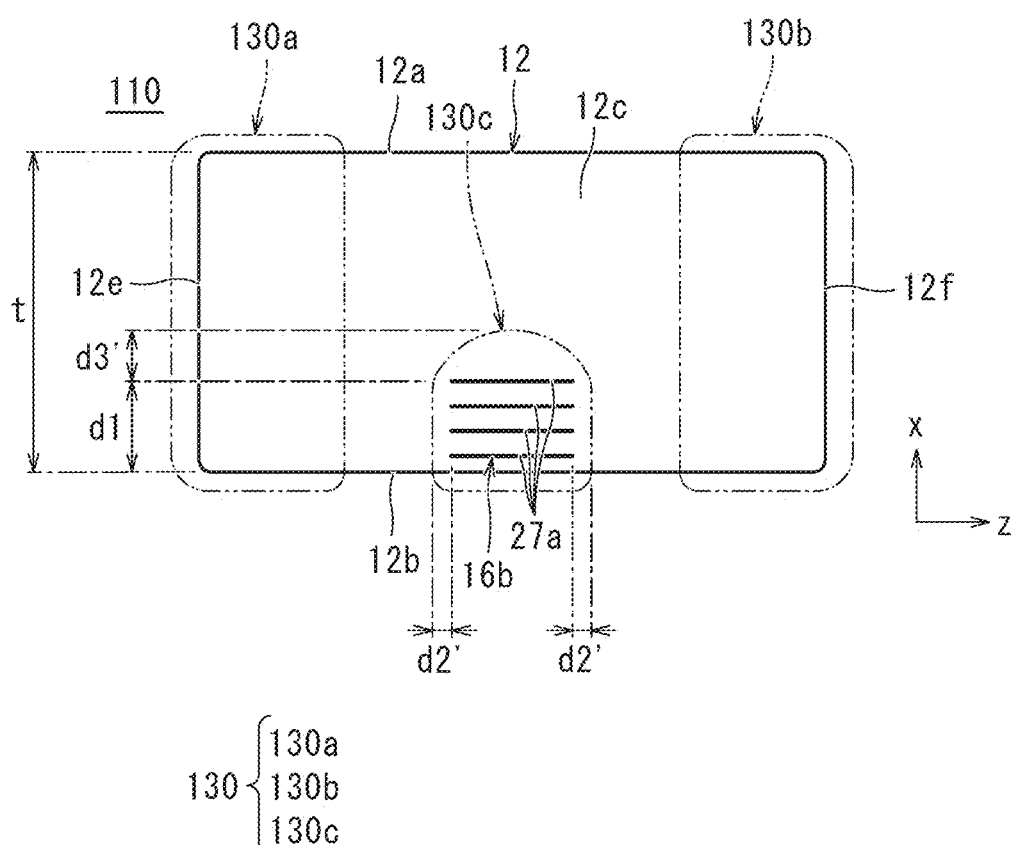
FIG. 20 is a schematic diagram viewed from the side of a first side surface of the multilayer ceramic capacitor according to the second preferred embodiment of the present invention.

A multilayer ceramic capacitor 110 as an example of a multilayer ceramic capacitor according to the second preferred embodiment of the present invention will be hereinafter described. FIG. 12 is an external perspective view showing an example of the multilayer ceramic capacitor according to the second preferred embodiment of the present invention. FIG. 13 is a top view showing an example of the multilayer ceramic capacitor according to the second preferred embodiment of the present invention. FIG. 14 is a bottom view showing an example of the multilayer ceramic capacitor according to the second preferred embodiment of the present invention. FIG. 15 is a side view showing an example of the multilayer ceramic capacitor according to the second preferred embodiment of the present invention. FIG. 16 is a cross-sectional view taken along a line XVI-XVI in FIG. 12. FIG. 17 is a cross-sectional view taken along a line XVII-XVII in FIG. 12. FIG. 18 is a cross-sectional view taken along a line XVIII-XVIII in FIG. 16. FIG. 19 is a cross-sectional view taken along a line XIX-XIX in FIG. 16. FIG. 20 is a schematic diagram viewed from the side of a first side surface of the multilayer ceramic capacitor according to the second preferred embodiment of the present invention.

As shown in FIGS. 12 to 20, multilayer ceramic capacitor 110 according to the second preferred embodiment includes a multilayer body 12 and an external electrode 130. In multilayer ceramic capacitor 110, third external electrode 30c and fourth external electrode 30d of multilayer ceramic capacitor 10 according to the first preferred embodiment are contiguously disposed on second main surface 12b. Therefore, the components corresponding to those in the first preferred embodiment are denoted by the same reference characters, and the detailed description thereof will not be repeated.

The following describes external electrode 130 of multilayer ceramic capacitor 110 according to the second preferred embodiment. External electrode 130 includes a first external electrode 130a disposed on the first end surface 12e side, a second external electrode 130b disposed on the second end surface 12f side, and a third external electrode 130c disposed on the first side surface 12c side and the second side surface 12d side and contiguously disposed on second main surface 12b.

First external electrode 130a and second external electrode 130b of external electrode 130 according to the second preferred embodiment correspond to first external electrode 30a and second external electrode 30b, respectively, of external electrode 30 according to the first preferred embodiment. Thus, the detailed description thereof will not be repeated in the present preferred embodiment.

Third external electrode 130c of external electrode 130 according to the second preferred embodiment is disposed on a portion of first side surface 12c, a portion of second side surface 12d, and a portion of second main surface 12b of multilayer body 12. Further, third external electrode 130c is contiguously disposed on second main surface 12b. Further, third external electrode 130c is connected to second internal electrode layer 16b.

Further, the end portion of third external electrode 130c in length direction z on each of first and second side surfaces 12c and 12d is preferably located at a distance of, for example, about 5 μm or more and about 100 μm or less from the end portion of second internal electrode layer 16b in length direction z of multilayer body 12 that is exposed at a corresponding one of first and second side surfaces 12c and 12d of multilayer body 12. In this case, more specifically, a length d2' is preferably, for example, about 5 μm or more and about 100 μm or less, in which length d2' extends between the end portion of third external electrode 130c on each of first and second side surfaces 12c and 12d in length direction z of multilayer body 12, and the end portion of second internal electrode layer 16b in length direction z of multilayer body 12 that is exposed at a corresponding one of first and second side surfaces 12c and 12d of multilayer body 12.

Further, the end portion of third external electrode 130c on each of first and second side surfaces 12c and 12d in stacking direction x of multilayer body 12 is preferably located at a distance of, for example, about 5 μm or more and about 100 μm or less from second internal electrode layer 16b closest to first main surface 12a that is exposed at a corresponding one of first and second side surfaces 12c and 12d of multilayer body 12. In this case, more specifically, a length d3' is preferably, for example, about 5 μm or more and about 100 μm or less, in which length d3' extends between the end portion of each of third and fourth external electrodes 30c and 30d in stacking direction x of multilayer body 12 and the end portion of second internal electrode layer 16b in stacking direction x of multilayer body 12 that is exposed at a corresponding one of first and second side surfaces 12c and 12d of multilayer body 12.

By disposing third external electrode 130c as described above, the area where third external electrode 130c covers multilayer body 12 can be reduced while maintaining the reliability of electrical connection between second internal electrode layer 16b and third external electrode 130c, so that heat can be further dissipated.

Further, disposing third external electrode 130c as described above achieves an effect that the self-alignment effect is readily exerted even if mounting misalignment occurs when multilayer ceramic capacitor 10 is mounted on the substrate.

External electrode 130 includes an underlying electrode layer 132 disposed on the surface of multilayer body 12 and a plating layer 134 disposed to cover underlying electrode layer 132. Underlying electrode layer 132 includes a first underlying electrode layer 132a, a second underlying electrode layer 132b, and a third underlying electrode layer 132c. Plating layer 134 includes a first plating layer 134a, a second plating layer 134b, and a third plating layer 134c. In other words, first external electrode 130a includes first underlying electrode layer 132a and first plating layer 134a. Second external electrode 130b includes second underlying electrode layer 132b and second plating layer 134b. Third external electrode 130c includes third underlying electrode layer 132c and third plating layer 134c. Underlying electrode layer 132 and plating layer 134 of external electrode 130 according to the second preferred embodiment correspond to underlying electrode layer 32 and plating layer 34, respectively, of external electrode 30 according to the first preferred embodiment. Thus, the detailed description thereof will not be repeated in the present preferred embodiment.

2. Mounting Structure of Multilayer Ceramic Capacitor

Figure 21:
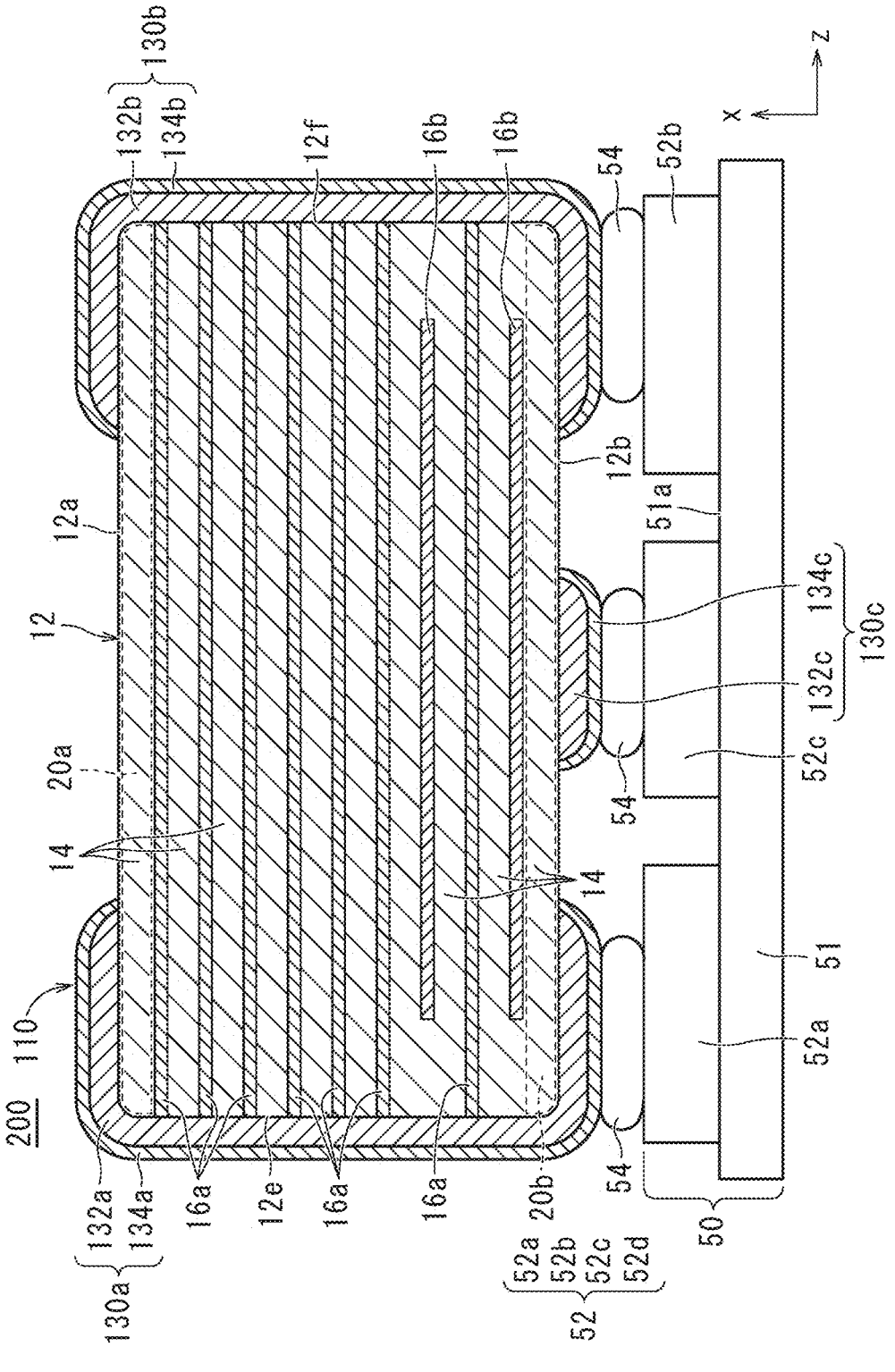
FIG. 21 is a cross-sectional view taken in a length direction and showing an example of a mounting structure of the multilayer ceramic capacitor according to the second preferred embodiment of the present invention.
Figure 22:
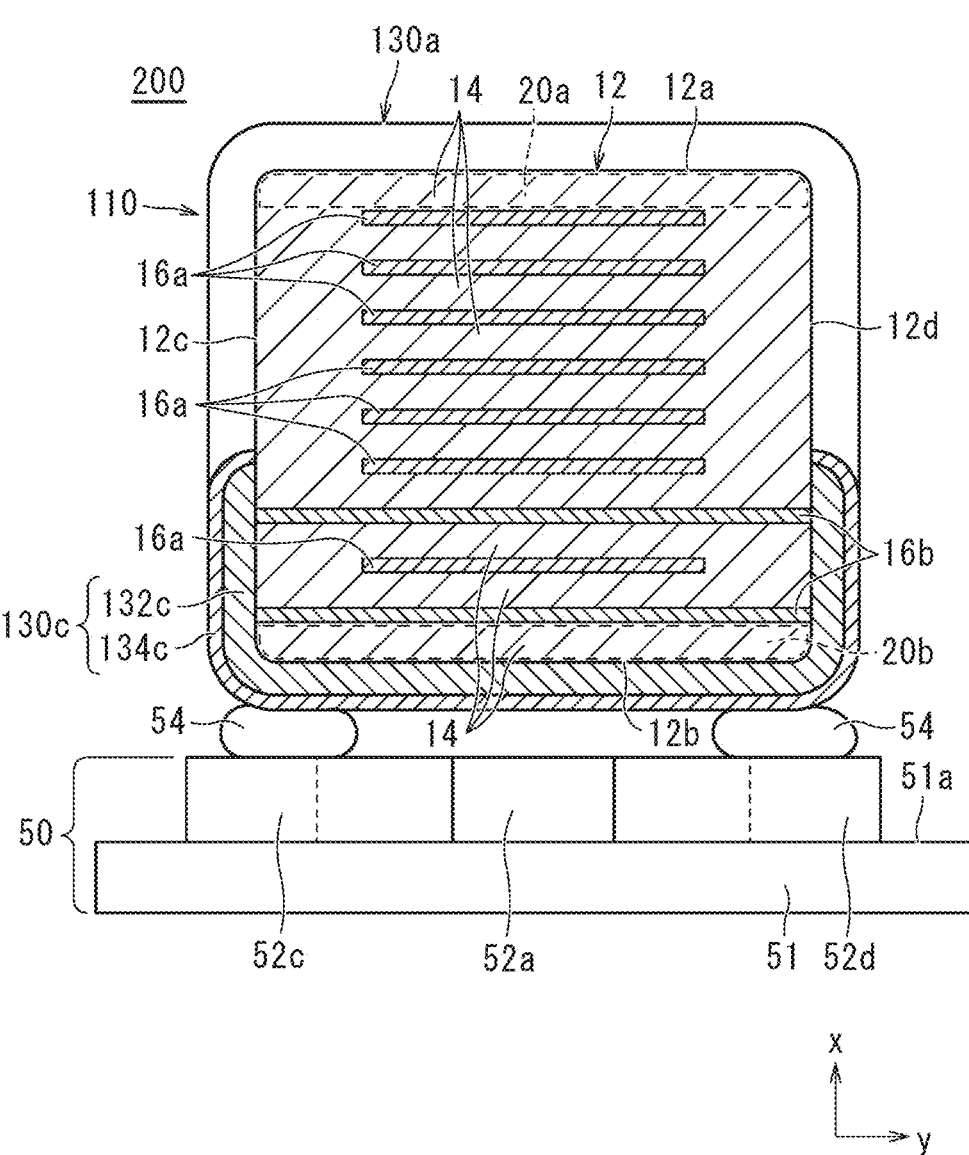
FIG. 22 is a cross-sectional view taken in a width direction and showing an example of the mounting structure of the multilayer ceramic capacitor according to the second preferred embodiment of the present invention.

The following describes a mounting structure of the multilayer ceramic capacitor according to the second preferred embodiment of the present invention with reference to FIGS. 21 and 22.

As shown in FIGS. 21 and 22, a mounting structure 200 of the multilayer ceramic capacitor according to the second preferred embodiment includes multilayer ceramic capacitor 110 and mounting substrate 50 according to the second preferred embodiment. Mounting substrate 50 includes a core member 51 and a conductor land 52 of the substrate. Since core member 51 and conductor land 52 in the substrate of mounting substrate 50 are the same as those in mounting structure 100 of the multilayer ceramic capacitor according to the first preferred embodiment, the detailed description thereof will not be repeated in the present preferred embodiment.

Mounting structure 200 of the multilayer ceramic capacitor shown in FIGS. 21 and 22 is mounted on mounting substrate 50 such that second main surface 12b of multilayer ceramic capacitor 110 faces substrate-side mounting surface 51a. This implements electrical connection between multilayer ceramic capacitor 110 and mounting substrate 50 in the state in which the distance from substrate-side mounting surface 51a of mounting substrate 50 to each of first and second extending portions 27a and 27b respectively extending from first and second side surfaces 12c and 12d is reduced or minimized.

Further, in mounting structure 200 of the multilayer ceramic capacitor shown in FIGS. 21 and 22, third external electrode 130c is contiguously disposed on the second main surface 12b side of multilayer body 12. Accordingly, multilayer ceramic capacitor 110 is mounted on mounting substrate 50 such that second main surface 12b of multilayer ceramic capacitor 110 faces substrate-side mounting surface 51a, to thereby achieve an effect that the self-alignment effect is readily exerted even if mounting misalignment occurs when multilayer ceramic capacitor 110 is mounted on the substrate.

Accordingly, in mounting structure 200 of multilayer ceramic capacitor 110 shown in FIGS. 21 and 22, various functions of multilayer ceramic capacitor 110 according to the second preferred embodiment of the present invention described above are reflected as they are, and thereby, the current path from second internal electrode layer 16b of multilayer ceramic capacitor 110 to mounting substrate 50 can be shortened as compared with the conventional case. As a result, various effects of multilayer ceramic capacitor 110 according to the second preferred embodiment of the present invention are reflected to achieve the effect of improving the low ESL characteristics in the mounting structure of the multilayer ceramic capacitor.

3. Method of Manufacturing Multilayer Ceramic Capacitor

The following describes a method of manufacturing multilayer ceramic capacitor 110 according to the second preferred embodiment of the present invention. Since the method of manufacturing multilayer body 12 is the same as the method of manufacturing multilayer ceramic capacitor 10 according to the first preferred embodiment, a method of forming external electrode 130 on multilayer body 12 will be hereinafter described.

Underlying Electrode Layer

Third underlying electrode layer 132c of third external electrode 130c is formed on each of first side surface 12c and second side surface 12d of multilayer body 12 obtained by firing. When a baked layer is formed as underlying electrode layer 132, a conductive paste including a glass component and a metal component is applied and then baked to thereby form a baked layer as underlying electrode layer 132. The baking temperature at this time is preferably about 700° C. or higher and about 900° C. or lower. In the present preferred embodiment, underlying electrode layer 132 is formed of a baked layer.

In this case, various methods can be used as a method of forming a baked layer. Example of the method used herein include a method of adjusting the direction of multilayer body 12 by a camera or a magnet such that second main surface 12b is located below, and then holding multilayer body 12 with a holding jig and extruding the conductive paste through a slit or a hole so as to be applied. In the case of this method, by increasing the extrusion amount of the conductive paste, third underlying electrode layer 132c can be formed not only on second main surface 12b but also on a portion of first side surface 12c and a portion of second side surface 12d so as to cover second internal electrode layer 16b exposed at first and second side surfaces 12c and 12d. Further, a roller transfer method can also be used. In the case of the roller transfer method, when third underlying electrode layer 132c is formed not only on second main surface 12b but also on a portion of first side surface 12c and a portion of second side surface 12d so as to cover second internal electrode layer 16b exposed at first and second side surfaces 12*c* and 12*d*, the pressing pressure during roller transfer is increased, so that third underlying electrode layer 132*c* can be formed on a portion of first side surface 12*c* and a portion of second side surface 12*d* so as to cover second internal electrode layer 16*b* exposed at first and second side surfaces 12*c* and 12*d*.

Then, first underlying electrode layer 132*a* of first external electrode 130*a* is formed on first end surface 12*e* of multilayer body 12 obtained by firing, and second underlying electrode layer 132*b* of second external electrode 130*b* is formed on second end surface 12*f* of multilayer body 12.

In the present preferred embodiment, first underlying electrode layer 132*a* and second underlying electrode layer 132*b* are formed by a DIP method so as to extend not only to reach first end surface 12*e* and second end surface 12*f* but also to reach a portion of first main surface 12*a*, a portion of second main surface 12*b*, a portion of first side surface 12*c*, and a portion of second side surface 12*d*.

In the baking treatment, first underlying electrode layer 132*a* of first external electrode 130*a*, second underlying electrode layer 132*b* of second external electrode 130*b*, and third underlying electrode layer 132*c* of third external electrode 130*c* may be baked simultaneously, or first underlying electrode layer 132*a* of first external electrode 130*a*, second underlying electrode layer 132*b* of second external electrode 130*b*, and third underlying electrode layer 132*c* of third external electrode 130*c* may be baked separately.

Conductive Resin Layer

In the case where underlying electrode layer 132 is formed of a conductive resin layer, the conductive resin layer can be formed by the following method. Note that the conductive resin layer may be formed on the surface of the baked layer, or the conductive resin layer may alone be directly formed on multilayer body 12 without forming the baked layer.

As a method of forming a conductive resin layer, a conductive resin paste including a thermosetting resin and a metal component is applied on the baked layer or multilayer body 12, and subjected to heat treatment at a temperature of about 250° C. or higher and about 550° C. or lower to thermally cure the resin to thereby form a conductive resin layer. At this time, the atmosphere during the heat treatment is preferably an N2 atmosphere. In order to prevent scattering of the resin and to prevent oxidation of various metal components, the oxygen concentration is preferably suppressed to be about 100 ppm or less, for example.

Examples of the method of applying a conductive resin paste may include a method of extruding the conductive resin paste through a slit so as to be applied or a roller transfer method, similarly to the method of forming underlying electrode layer 132 from a baked layer.

Thin Film Layer

When underlying electrode layer 132 is formed of a thin film layer, masking or the like is performed, and as a result, underlying electrode layer 132 can be formed by a thin film forming method such as a sputtering method or a vapor deposition method at a position where external electrode 30 is desired to be formed. Underlying electrode layer 132 formed of a thin film layer is provided such that metal particles are deposited to form a layer of about 1 μm or less, for example.

Plating Layer

Further, external electrode 130 may be formed only of a plating layer without providing underlying electrode layer 132. In this case, external electrode 130 can be formed by the following method.

First end surface 12*e* and second end surface 12*f* of multilayer body 12 are plated to form a lower plating electrode in the portion where first internal electrode layer 16*a* is exposed. Similarly, first side surface 12*c* and second side surface 12*d* of multilayer body 12 are plated to form a lower plating electrode in the portion where second internal electrode layer 16*b* is exposed. In the plating treatment, either electrolytic plating or electroless plating may be adopted, but electroless plating requires a pretreatment with a catalyst or the like in order to improve the plating precipitation speed, which disadvantageously complicates the process. Thus, it is usually preferable to use electrolytic plating. As a plating method, barrel plating is preferably used. Further, an upper plating electrode formed on the surface of the lower plating electrode may be similarly formed as required.

Finally, plating layer 134 is formed. Plating layer 134 may be formed on the surface of underlying electrode layer 132 or may be formed directly on multilayer body 12. In the present preferred embodiment, plating layer 134 is formed on the surface of underlying electrode layer 132. More specifically, an Ni plating layer as a lower plating layer and an Sn plating layer as an upper plating layer are formed on underlying electrode layer 132. In the plating treatment, either electrolytic plating or electroless plating may be adopted. However, electroless plating requires a pretreatment with a catalyst or the like in order to improve the plating precipitation speed, which disadvantageously complicates the process. Thus, it is usually preferable to use electrolytic plating.

As described above, multilayer ceramic capacitor 110 according to the present preferred embodiment is manufactured.

Although the preferred embodiments of the present invention have been disclosed as above in the aforementioned description, the present invention is not limited thereto.

In other words, various modifications can be made to the above-described preferred embodiments with regard to mechanisms, shapes, materials, number and quantities, positions, arrangements, or the like without departing from the scope of the present invention, and are included in the present invention.

Preferred embodiments of the present invention relates to multilayer ceramic capacitors and mounting structures of the multilayer ceramic capacitors, and particularly can be utilized as multilayer ceramic capacitors and mounting structures of the multilayer ceramic capacitors that are capable of fully achieving a sufficient heat dissipation effect and a low ESL effect while decreasing a capacitance and yet suppressing an increase in DC resistance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers stacked on one another and a plurality of internal electrode layers respectively stacked on the dielectric layers, the multilayer body including:
a first main surface and a second main surface that face each other in a stacking direction;

a first side surface and a second side surface that face each other in a width direction perpendicular or substantially perpendicular to the stacking direction; and a first end surface and a second end surface that face each other in a length direction perpendicular or substantially perpendicular to the stacking direction and the width direction;

a first external electrode on the first end surface;

a second external electrode on the second end surface;

a third external electrode on the first side surface; and a fourth external electrode on the second side surface; wherein the internal electrode layers include:

at least one first internal electrode layer exposed at the first end surface and the second end surface; and at least two second internal electrode layers exposed at the first side surface and the second side surface;

the at least one first internal electrode layer is located only within a range from the second main surface to about one third of the multilayer body in the stacking direction;

at least one of the at least one first internal electrode layer is sandwiched between the at least two second internal electrode layers in the stacking direction; and all internal electrode layers exposed at the first and second side surfaces are located only within the range from the second main surface to about one third of the multilayer body in the stacking direction.

2. The multilayer ceramic capacitor according to claim 1, further comprising:

a plurality of first internal electrode layers including the at least one first internal electrode layer;

a first region in which the dielectric layers and the plurality of first internal electrode layers are alternately stacked; and a second region in which the at least one first internal electrode layer and the at least two second internal electrode layers are alternately stacked with the dielectric layer interposed therebetween; wherein the second region is located closer to the second main surface than the first region.

3. The multilayer ceramic capacitor according to claim 1, wherein the third external electrode includes a first bent portion on the second main surface to be in parallel or substantially in parallel with the at least two second internal electrode layers; and the fourth external electrode includes a second bent portion on the second main surface to be in parallel or substantially in parallel with the at least two second internal electrode layers.

4. The multilayer ceramic capacitor according to claim 1, wherein the third external electrode and the fourth external electrode are contiguously provided on the second main surface.

5. The multilayer ceramic capacitor according to claim 1, further comprising:

a plurality of first internal electrode layers including the at least one first internal electrode layer; wherein the plurality of first internal electrode layers are greater in number than the at least two second internal electrode layers.

6. The multilayer ceramic capacitor according to claim 1, wherein an end portion of each of the third external electrode and the fourth external electrode in the length direction of the multilayer body is located at a distance of about 5 μm or more and about 100 μm or less from an end portion of the at least two second internal electrode layers in the length direction of the multilayer body, the end portion of the at least two second internal electrode layers being exposed at a corresponding one of the first side surface and the second side surface.

7. The multilayer ceramic capacitor according to claim 1, wherein an end portion of each of the third external electrode and the fourth external electrode in the stacking direction of the multilayer body is located at a distance of about 5 μm or more and about 100 μm or less from one of the at least two second internal electrode layers located closest to the first main surface and exposed at a corresponding one of the first side surface and the second side surface.

8. A mounting structure of a multilayer ceramic capacitor, the mounting structure comprising:

a mounting substrate; and a multilayer ceramic capacitor mounted on the mounting substrate; wherein the multilayer ceramic capacitor is the multilayer ceramic capacitor according to claim 1;

the mounting substrate includes:

a core of a substrate;

a first connection conductor on the core and connected to the first external electrode;

a second connection conductor on the core and connected to the second external electrode;

a third connection conductor on the core and connected to the third external electrode; and a fourth connection conductor on the core and connected to the fourth external electrode; and the multilayer ceramic capacitor is mounted such that the second main surface faces the mounting substrate.

9. The mounting structure according to claim 8, further comprising:

a plurality of first internal electrode layers including the at least one first internal electrode layer;

a first region in which the dielectric layers and the plurality of first internal electrode layers are alternately stacked; and a second region in which the at least one first internal electrode layer and the at least two second internal electrode layers are alternately stacked with the dielectric layer interposed therebetween; wherein the second region is located closer to the second main surface than the first region.

10. The mounting structure according to claim 8, wherein the third external electrode includes a first bent portion on the second main surface to be in parallel or substantially in parallel with the at least two second internal electrode layers; and the fourth external electrode includes a second bent portion on the second main surface to be in parallel or substantially in parallel with the at least two second internal electrode layers.

11. The mounting structure according to claim 8, wherein the third external electrode and the fourth external electrode are contiguously provided on the second main surface.

12. The mounting structure according to claim 8, further comprising:

a plurality of first internal electrode layers including the at least one first internal electrode layer; wherein the plurality of first internal electrode layers are greater in number than the at least two second internal electrode layers.

13. The mounting structure according to claim 8, wherein an end portion of each of the third external electrode and the fourth external electrode in the length direction of the multilayer body is located at a distance of about 5 μm or more and about 100 μm or less from an end portion of the at least two second internal electrode layers in the length direction of the multilayer body, the end portion of the at least two second internal electrode layers being exposed at a corresponding one of the first side surface and the second side surface.

14. The mounting structure according to claim 8, wherein an end portion of each of the third external electrode and the fourth external electrode in the stacking direction of the multilayer body is located at a distance of about 5 μm or more and about 100 μm or less from one of the at least two second internal electrode layers located closest to the first main surface and exposed at a corresponding one of the first side surface and the second side surface.

* * * * *

26